(12) United States Patent
Kitaoka et al.

(10) Patent No.: US 7,535,610 B2
(45) Date of Patent: May 19, 2009

(54) LIGHT SOURCE APPARATUS, METHOD FOR ADJUSTING THE SAME AND METHOD FOR PRODUCING THE SAME

(75) Inventors: Yoshitaka Kitaoka, Osaka (JP); Atsushi Sogami, Osaka (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 11/546,452

(22) Filed: Oct. 12, 2006

(65) Prior Publication Data

US 2007/0086085 A1    Apr. 19, 2007

(30) Foreign Application Priority Data

Oct. 14, 2005    (JP)    ............................. 2005-300041
Apr. 10, 2006    (JP)    ............................. 2006-107368

(51) Int. Cl.
*G02B 26/08*    (2006.01)
(52) U.S. Cl. .................... 359/196; 359/819; 362/277
(58) Field of Classification Search ................ 359/196, 359/819, 820; 347/242, 243; 362/277
See application file for complete search history.

(56) References Cited

U.S. PATENT DOCUMENTS

2002/0141186 A1 * 10/2002  Takase ..................... 362/277

2005/0206717 A1 *  9/2005  Boyatt et al. ............... 347/242

FOREIGN PATENT DOCUMENTS

| JP | 63162310 | 10/1988 |
|---|---|---|
| JP | 3077375 | 11/1993 |
| JP | 2001264669 | 9/2001 |

* cited by examiner

*Primary Examiner*—Euncha P Cherry
(74) *Attorney, Agent, or Firm*—Dickinson Wright, PLLC

(57) ABSTRACT

A light source apparatus includes a light source unit in which a light source and a light source supporting member having elasticity in an optical axis direction are coupled together, and a collimating lens base member on which a collimating lens is supported. An optical axis direction adjusting member is positioned between the light source unit and the collimating lens base member. A position of the light source unit can be adjusted within a plane approximately perpendicular to the optical axis, and the light source unit can thereafter be secured relative to the collimating lens base member via the light source supporting member. The optical axis direction adjusting member is movable in the optical axis direction, and is disposed such that by its movement it causes the light source supporting member to deform against the elasticity of the light source supporting member, thereby allowing an adjustment of a position of the light source with respect to the collimating lens in the optical axis direction.

30 Claims, 23 Drawing Sheets

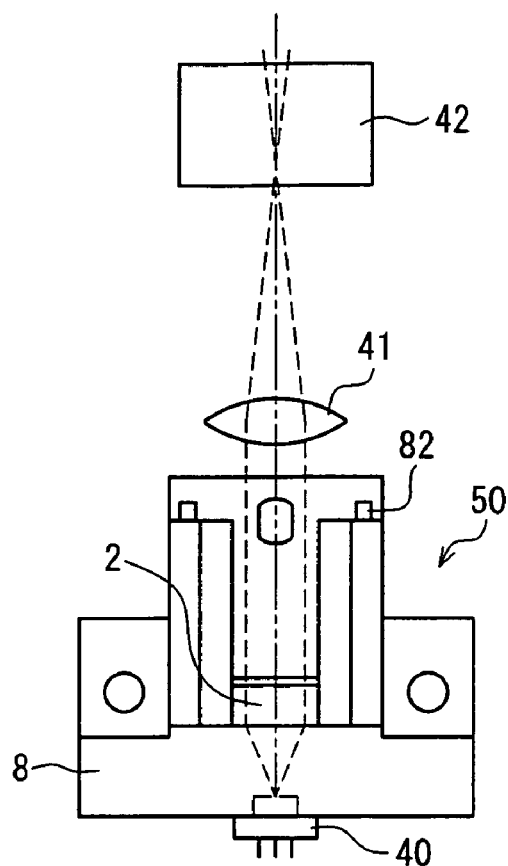
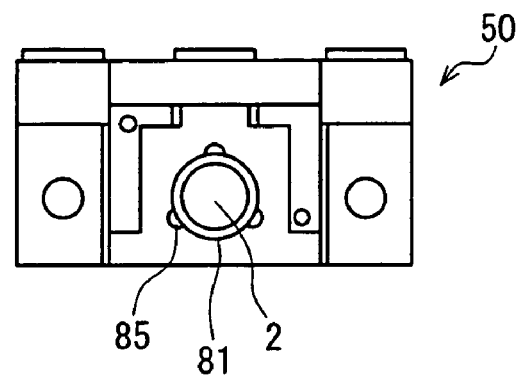
FIG. 5A  FIG. 5B
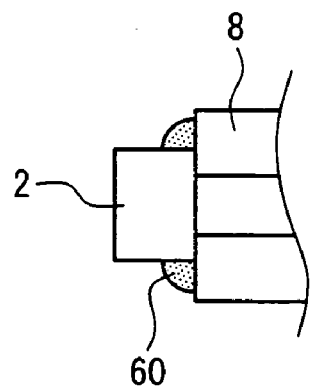
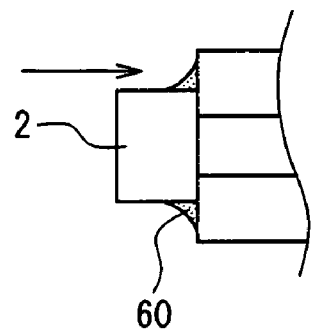
FIG. 6A  FIG. 6B

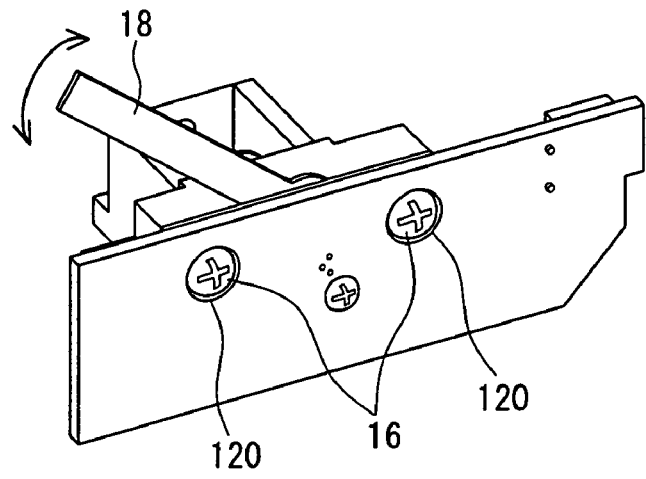
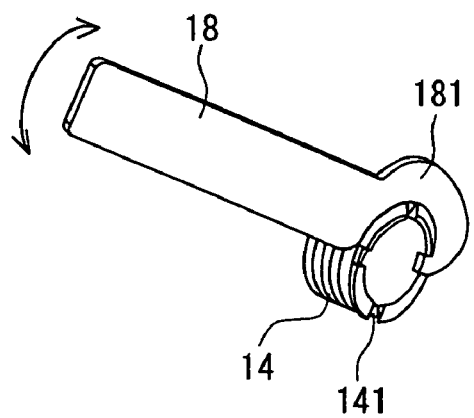
FIG. 10A  FIG. 10B
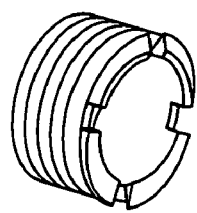
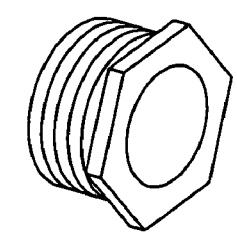
FIG. 11A  FIG. 11B

LIGHT SOURCE APPARATUS, METHOD FOR ADJUSTING THE SAME AND METHOD FOR PRODUCING THE SAME

This application claims the benefit of Japanese Patent Application No. 2005-300041 filed on Oct. 14, 2005 and of Japanese Patent Application No. 2006-107368 filed on Apr. 10, 2006, the entire disclosures of which are hereby incorporated by reference as if fully set forth herein.

BACKGROUND OF THE INVENTION

1. Field of the Invention

The present invention relates to a mechanism for adjusting the distance between a light source and a collimating lens in the optical axis direction in a light source apparatus of an optical scanning apparatus that can be used for image recording apparatuses such as laser printers, multifunction devices and facsimile devices, and to a method for producing the mechanism.

2. Description of Related Art

FIGS. 24A and 24B are diagrams schematically showing a configuration of an example of a related art optical scanning apparatus in a laser beam printer. FIG. 24A is a perspective view and FIG. 24B is a top view showing a configuration of the main optical components.

In the following, an outline of the operations of the optical scanning apparatus is briefly described with reference to FIG. 24B. The divergent light emitted from a light source (semiconductor laser) 101 passes through a collimating lens 102, a diaphragm 103 and a cylindrical lens 104, reflected and scanned at a polygon mirror 105, passes through an fθ lens 106, and is imaged and scanned at constant speed on a photosensitive material 107. In a light source apparatus 110, the divergent light emitted from the light source is converted into parallel light beams at the collimating lens 102, and the light beams are shaped by passing through the diaphragm 103.

Here, the conditions required for the light source apparatus 110 constituted by a light source 101, the collimating lens 102 and the diaphragm 103 are that the optical axis of the light source 101 and the optical axis of the collimating lens 102 coincide with the desired optical axis of the light source apparatus 110, and that the distance between the light source 101 and the collimating lens 102 is adjusted such that laser light 109 that is output from the light source 101 is converted into parallel light beams by the collimating lens 102.

In general, in an optical scanning apparatus of an underfield optical system, a collimating lens 102 having a focal length of about 6 mm to about 15 mm is selected. When the focal length of the collimating lens 102 is increased, the width of the parallel light beams after passing through the collimating lens 102 increases. When the diaphragm 103 is made larger correspondingly, a large polygon mirror 105 will be required. In that case, problems relating to electric power, starting time, noise, heat and the like will arise.

On the other hand, when the diaphragm 103 is not made large, the amount of light passing through the diaphragm 103 decreases, so that a light source 101 with a large output will be required. In addition, there will be a large amount of vignetting of the light beams at the diaphragm 103, and therefore the beam diameter of the optical scanning apparatus increases due to the influence of the beam diffraction.

However, when the optical scanning apparatus is placed in a laser printer, a charging apparatus, a developing apparatus, a transfer apparatus, a cleaning apparatus for the photosensitive material and the like are present around the photosensitive material 107, and therefore the optical scanning apparatus is placed some distance from the photosensitive material 107. Accordingly, an fθ lens 6 having a focal length of about 100 mm to about 200 mm naturally will be used for the optical scanning apparatus.

Here, when the focal length of the collimating lens 102 is set to 10 mm, and the focal length of the fθ lens 106 is set to 200 mm, the lateral magnification is 20 times and the longitudinal magnification is 400 times, since the lateral magnification is equivalent to the focal length ratio and the longitudinal magnification is equivalent to the square of the focal length ratio. This means that when there is an error of 10 µm in the optical axis alignment, the positional displacement on the photosensitive material 107 is 200 µm, and when there is similarly an error of 10 µm in the adjustment of the distance between the collimating lens 102 and the light source 101, the focus displacement on the photosensitive material 107 is 4 mm.

That is to say, when a collimating lens having a short focal length is selected as the collimating lens 102, the magnification is even higher, resulting in an even more serious error in the adjustment of the light source apparatus 110. Since the magnification of the light source apparatus 110 of the optical scanning apparatus is high in this way, the precision in the adjustment and the stability after the adjustment are important and an extremely high reliability is required particularly in the adjustment of the distance between the collimating lens 102 and the light source 101.

Under such circumstances, various methods for adjusting the distance between the collimating lens 102 and the light source 101 have been proposed for ensuring the adjustment precision and decreasing the number of man-hours for adjustment. These methods broadly can be divided into a method of making an adjustment by moving the collimating lens 102 parallel to the optical axis direction while keeping the light source 101 fixed, and conversely a method of moving the light source 101 parallel to the optical axis direction while keeping the collimating lens 102 fixed.

FIG. 25 shows a typical example of a distance adjustment method in which a semiconductor laser is fixed and a collimating lens is movable (see JP 63-162310 U (page 1, FIG. 1)). A collimating lens that has been inserted and fixed in a lens barrel 111 in advance is placed on a V-groove 113 of a holding member 112 and moved back and forth in the optical axis direction to adjust the distance to the light source 114. In addition, with this configuration, the adjustment of the optical axis is performed by finely adjusting the position at which a light source fixing member 115 is bonded to the holding member 112.

However, with this method, the optical axis may be displaced when performing the distance adjustment by moving the collimating lens back and forth in the optical axis direction, or the distance to the light source 114 may be shifted when, conversely, moving the light source fixing member 115 on the plane perpendicular to the holding member 112 and the V-groove 113 for adjustment, if precision has not been achieved, for example, for the parallelism between the two planes forming the V-groove 113, their respective flatness, the flatness of the perpendicular plane of the holding member 112 to which the light source fixing member 115 is mounted, and the perpendicularity between the perpendicular plane of the holding member 112 and the V-groove 113.

Moreover, the optical axis may be displaced when performing the distance adjustment, if a sufficient precision has not been achieved also for the fixation of the lens to the lens barrel 111. If the lens barrel 111 were to be omitted in order to reduce the cost, the collimating lens would become unstable on the V-groove 113 due to its small thickness, making it difficult to achieve precision or to reduce the number of man-hours for adjustment.

That is, this configuration requires a high precision for the holding member 112, the lens barrel 111 and all the components for fixing the lens to the lens barrel 111, and takes a large number of man-hours if the precision cannot be ensured. This structure is simple and therefore is of low cost in terms of the materials, but is of high cost in terms of the quality control for the components, the yield and the number of man-hours.

Furthermore, when the pressing force for bringing the lens barrel 111 and the V-groove 113 into close contact is small, a gap is formed between the edge of the V-groove 113 and the lens barrel 111 when moving the lens barrel 111 back and forth, which may cause a displacement of the lens optical axis. However, when the pressing force is large, the friction between the lens barrel 111 and the holding member 112 increases, thus making it difficult to smoothly move the lens barrel 111 back and forth during the distance adjustment and increasing the adjustment operation time.

When an inexpensive molded resin is used for the holding member 112, the pressing force of an elastic member 116 may cause the holding member 112 to undergo creep deformation under a high temperature environment, which places limitations on the selection of materials. Furthermore, there are also the problems of a displacement due to expansion or constriction of the members caused by temperature changes and a displacement due to vibrations, impact forces and the like from the outside.

In view of these considerations, a measure that is generally taken is to inject an adhesive into the space between the lens barrel 111 and the holding member 112 to prevent displacement. However, this does not provide a fundamental solution. The reason is that the adhesive undergoes a volume change when cured and therefore the distance to the optical axis or the light source 114 may be shifted when the adhesive is cured after completion of the adjustment.

A distance adjustment method in which, conversely to the above-described configuration, the lens is fixed and the light source is movable also has been proposed (for example, see JP 2001-264669 A (pages 3 to 4, FIG.3)). According to the method of JP 2001-264669 A, a light source (semiconductor laser) 401 is fixed to a casing 402, which is a hollow screw, and the whole structure is fixed to a base 405 with two nuts 403 and 404, as shown in FIG. 26.

However, this method in which the position of the light source is fixed by tightening the two nuts 403 and 404 has several drawbacks as the adjustment operation. First, the light source rotates at the time of performing the distance adjustment. Since the longitudinal divergence angle and the lateral divergence angle of the laser light from the light source 401 are different, rotation of the light source causes the beam diameter to deviate from an optimum value due to the influence of an eclipse in light beams at the diaphragm. Accordingly, it is necessary to provide a separate device that is not described in this document to prevent the light source from rotating.

Further, the tightening torque load of the nuts 403 and 404 causes deformation of various components and variations between the components, such as play and backlash. The focus position changes subtly depending on the magnitude of the tightening torque. When the tightening torque of the nuts 403 and 404 is small, loosening of the screw occurs owing to impacts during transportation and vibrations inside the printer apparatus, thermal stress by temperature variations, so that the quality and the reliability of the product will be reduced significantly unless the management of the torque is performed.

When the structure is assembled with an excessive tightening torque, creep deformation due to heat leads to degradation of the quality over time. Furthermore, the fact that the tightening torque causes fluctuations of the focus position also leads to an increase in the number of man-hours for adjustment. The adjustment procedure for the case where the distance between the lens and the light source 401 is too close is discussed below. The nuts 403 and 404 behind the light source 401 are loosened temporarily, thereafter the front nut 403 is rotated by a desired angle to displace the light source 401 backward, and the rear nut 404 is tightened again. However, in this method, the position of the light source 401 and the relative positions of the nuts 403 and 404 and the screw are fixed by the fastening power of the two nuts 403 and 404, so that the front nut 403 actually is loosened slightly upon loosening the rear nut 404.

Accordingly, when displacing the light source 401 backward, it is necessary to rotate the front nut 403 by an extra amount to move the light source 401 backward by an extra amount, taking in consideration that the front nut is loosened. The degree of this operation is influenced, for example, by variations of components and the skill level of the operator, resulting in variations in quality, a decrease in reliability and an increase in the number of man-hours.

Another method in which the lens is fixed and the light source is movable as in the above-described method also has been proposed (Japanese Patent No. 3077375 (pages 4 to 5, FIG. 1 and FIG. 3)). FIGS. 27A to 27C show this adjustment method and the adjustment mechanism. FIG. 27A is an exploded perspective view of a light source apparatus. FIG. 27B is a rear view thereof, and FIG. 27C is a cross-sectional view taken along the line G-G in FIG. 27B.

The semiconductor laser 501 is positioned by a semiconductor laser positioning member 502, and an adjusting screw 504 is mounted to the central position of an adjusting screw holding member 503. A spacing member 508 retains an interval between a terminal 506 of the semiconductor laser 501 that is electrically connected to a signal cable (flexible cable) 505 and the adjusting screw 504, thus maintaining an electrically insulated state.

Moving the adjusting screw 504 back and forth causes a semiconductor laser holding portion 507 to which the semiconductor laser 501 mounted to move back and forth in the optical axis direction via the spacing member 508, thus adjusting the interval between the semiconductor laser 501 and a collimating lens 509.

It should be noted that the adjustment of the optical axis is carried out within the range of the outer diameter of fixing screws of 510 and 511 of the semiconductor laser unit and the gap between mounting holes 512 and 513, into which the fixing screws 510 and 511 are inserted.

Accordingly, the position of the semiconductor laser 501 may be adjusted, for example, by setting a jig for detecting a laser beam at the target position of the adjustment and moving a semiconductor laser mounting member 514 either in the main scanning direction or in the sub scanning direction, and the fixing screws 510 and 511 of the semiconductor laser unit may be tightened in a state in which the laser beam is in focus at a desired position.

However, this method has several problems as shown below. With this adjustment structure, the spacing member 508 is disposed on the back surface (the terminal side) of the semiconductor laser 501, so that it is structurally impossible to directly connect the circuit board to the semiconductor laser terminal. Since the circuit board cannot be mounted directly to the semiconductor laser 501, an electrical contact point is secured via the signal cable 505.

With this configuration, the electrical resistance and the capacitance of the signal line are increased, and therefore the response speed of the semiconductor laser 501 that is driven at high speed is reduced. Furthermore, the signal cable 505 is unstable and difficult to handle. For this reason, component failures such as a solder detachment and electrostatic breakdown of the semiconductor laser 501 may be induced during the transportation process of half-finished products or the assembling process of the light source apparatus.

Additionally, with this configuration, the adjusting screw 504 is in point contact with the spacing member 508, which maintains the adjustment position, so that the inclination of the elastic member tends to be unstable. When the position at which the adjusting screw 504 is in contact with the spacing member 508 is displaced from the center of the spacing member 508, a rotation moment may be generated on the spacing member 508, thus causing the elastic member to incline. This means that when the distance adjustment is performed after adjusting the optical axis, the optical axis will be displaced again. This problem occurs when the tip portion of the adjusting screw 504 is off-center or when the precision of the processing of the spacing member 508 and the assembly of the semiconductor laser unit is poor, leading to an increase in the number of man-hours in such a case. As a result, it is necessary to manage the components and the assembly precision, which causes an increase in the manufacturing cost, including the number of man-hours.

In addition, the fact that the contact between the adjusting screw 504 and the spacing member 508 is a point contact means that they are very unstable against vibrations caused by external forces. Vibrations, impact forces and the like that are applied from the outside during the laser scanning, and vibrations inside an apparatus that rotates at a high speed, such as a polygon motor, cause the semiconductor laser 501 to vibrate, thus possibly causing jitter and color drift in a print image.

In this configuration, a force countering the deformation of the elastic member is exerted on the semiconductor laser 501 and the adjusting screw 504, and this provides the effect of absorbing backlash of the adjusting screw 504. However, the adjustment of rotation of the adjusting screw 504 is carried out from behind the adjusting screw holding member 503, and therefore pressing a tool against adjusting screw 504 from behind for rotating the adjusting screw 504 causes the semiconductor laser 501 to be moved by an amount corresponding to the backlash of the adjusting screw 504. Also in this method, the operator is required to have a considerable level of skill. When the level of skill of the operator is low, the adjustment period will be long and the adjustment precision will be poor.

Further, when the temperature inside the apparatus fluctuates, the collimating lens base expands and contracts to cause fluctuations in the distance between the collimating lens 509 and the semiconductor laser 501, which may displace the focus position. This problem occurs especially when an inexpensive resin molded product is used in place of the collimating lens base.

Although it is possible to decrease the linear expansion coefficient by selecting a resin material containing reinforced fibers such as glass fibers, the orientation may change depending, for example, on the molding conditions of the resin, so that the linear expansion coefficient may not be of a desired value. In that case, with this configuration, it is necessary to correspondingly change the linear expansion coefficient by using varied raw materials for the collimating lens base itself. However, due to the complex shape of the collimating lens base, it is difficult to achieve a desired value of linear expansion coefficient by changing the molding conditions or the material.

Furthermore, this configuration requires a large number of components, including for example, the spacing member 508, the semiconductor laser mounting member 514, the adjusting screw holding member 503 and the signal cable 505, and thus is an expensive structure in terms of both the material costs and the number of man-hours for assembly. Additionally, it should be appreciated that the size of the light source apparatus will increase since the adjusting screw 504, the adjusting screw holding member 503 and the like are disposed behind the semiconductor laser 501.

SUMMARY OF THE INVENTION

As described above, although various methods have been proposed as the adjustment mechanism, they each have their advantages and disadvantages and there have been no methods that can solve all the above-described problems.

Therefore, it is an object of the present invention to solve the above-described related art problems, and to provide a light source apparatus that requires a lower number of man-hours for adjustment and thus is highly reliable and requires a lower number of components and thus is low-cost and small, and an adjustment method and a production method for the light source apparatus.

In order to achieve the foregoing object, a light source apparatus according to the present invention includes: a light source unit including a light source and a light source supporting member having elasticity in an optical axis direction, said light source and said light source supporting member being coupled together; a collimating lens; a collimating lens base member on which said collimating lens is supported; and an optical axis direction adjusting member disposed between the light source unit and the collimating lens base member, wherein a position of the light source unit can be adjusted within a plane approximately perpendicular to the optical axis and the light source unit can thereafter be secured relative to the collimating lens base member via the light source supporting member, and wherein the optical axis direction adjusting member is movable in the optical axis direction, and is disposed such that by its movement it causes the light source supporting member to deform against the elasticity of the light source supporting member, thereby allowing an adjustment of a position of the light source with respect to the collimating lens in the optical axis direction.

An optical scanning apparatus according to the present invention is an optical scanning apparatus including the above-described light source apparatus, an imaging optical system that images light emitted from the light source apparatus on a scanning surface and a scanning apparatus that scans the imaged light on the scanning surface.

A method for adjusting a light source according to the present invention is a method for adjusting a light source apparatus including a light source unit including a light source and a light source supporting member having elasticity in an optical axis direction, the light source and the light source supporting member being coupled together, a collimating lens, a collimating lens base member on which the collimating lens is supported, and an optical axis direction adjusting member that is disposed between the light source unit and the collimating lens base member and that is in contact with the light source supporting member, the method including (a) moving the optical axis direction adjusting member to deform the light source supporting member against the elasticity of the light source supporting member, thereby adjusting a position of the light source with respect to the collimating lens in the optical axis direction; and (b) adjusting a position of the light source unit in a plane approximately perpendicular to the optical axis and thereafter securing the light source unit relative to the collimating lens base member via the light source supporting member.

A method for producing an optical scanning apparatus according to the present invention is a method for producing an optical scanning apparatus including a light source apparatus including a light source unit including a light source and a light source supporting member having elasticity in an optical axis direction, the light source and the light source supporting member being coupled together, a collimating lens, a collimating lens base member on which the collimating lens is supported, and an optical axis direction adjusting member that is disposed between the light source unit and the collimating lens base member and that is in contact with the light source supporting member, the method including (a) moving the optical axis direction adjusting member to deform the light source supporting member against the elasticity of the light source supporting member, thereby adjusting a position of the light source with respect to the collimating lens in the optical axis direction; and (b) adjusting a position of the light source unit in a plane approximately perpendicular to the optical axis and thereafter securing the light source unit to the collimating lens base member via the light source supporting member.

With the present invention, it is possible to maintain the positional relationship between the light source and the collimating lens even after performing a positional adjustment. In addition, it is possible to readily perform an optical axis adjustment, independently of a positional adjustment between the light source and the collimating lens in the optical axis direction. Moreover, it is possible to provide a small light source apparatus having a low part count.

BRIEF DESCRIPTION OF THE DRAWINGS

The accompanying drawings, which are incorporated in and constitute a part of the specification, illustrate presently preferred non-limiting examples of exemplary embodiments of the invention, and, together with the general description given above and the detailed description of the preferred embodiments given below, serve to explain the principles and concepts of the invention, in which like reference characters designate like or corresponding parts throughout the several drawings. In the drawings;

FIG. 5A is a diagram illustrating a mounting and fixing step of a collimating lens 2 according to Embodiment 1 of the present invention.

FIG. 5B is a diagram showing the collimating lens base 8 in FIG. 5A, as viewed from the optical axis inspection camera 42 side.

FIG. 6A is a diagram showing a state before curing an adhesive in the mounting and fixing step of the collimating lens 2 according to Embodiment 1 of the present invention.

FIG. 6B is a diagram showing a state after curing the adhesive in the mounting and fixing step of the collimating lens 2 according to Embodiment 1 of the present invention.

FIG. 10A is a perspective view showing a state in which an adjusting tool 18 is inserted to a gap 60 of the light source apparatus according to Embodiment 1 of the present invention.

FIG. 10B is a perspective view showing how an adjusting screw 14 according to Embodiment 1 of the present invention is rotated.

FIG. 11A is a perspective view showing an example of an adjusting screw according to Embodiment 1 of the present invention.

FIG. 11B is a perspective view showing another example of the adjusting screw according to Embodiment 1 of the present invention.

FIG. 12A is a diagram showing a fluctuation of the focus position due to the temperature change of a refractive lens 2a.

DETAILED DESCRIPTION OF THE INVENTION

Figure 1A:
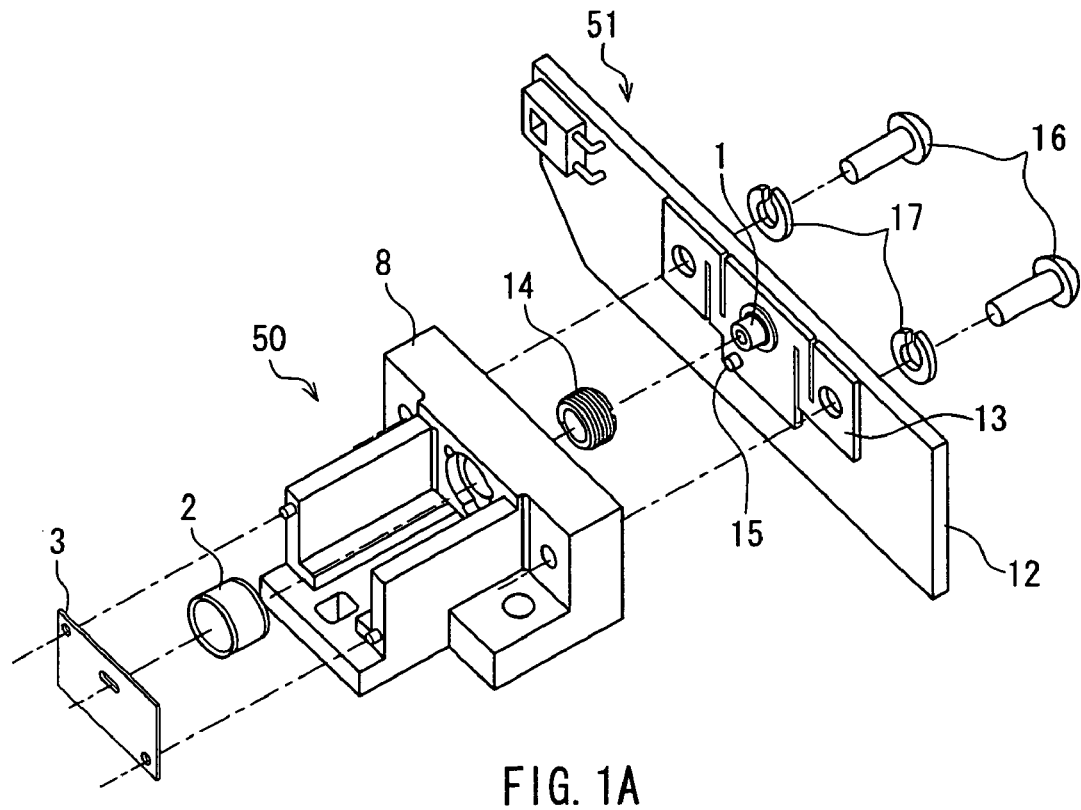
FIG. 1A is a perspective view of a light source apparatus according to Embodiment 1 of the present invention, as viewed obliquely from the front.

Reference will now be made in detail to the presently non-limiting, exemplary and preferred embodiments of the invention as illustrated in the accompanying drawings. The nature, concepts, objectives and advantages of the present invention will become more apparent to those skilled in the art after considering the following detailed description in connection with the accompanying drawings. The following description is provided in order to explain preferred embodiments of the present invention, with the particular features and details shown therein being by way of non-limiting illustrative examples of various embodiments of the present invention. The particular features and details are presented with the goal of providing what is believed to be the most useful and readily understood description of the principles and conceptual versions of the present invention. In this regard, no attempt is made to show structural details of the invention in more detail than is necessary for the fundamental understanding of the present invention. The detailed description considered with the appended drawings are intended to make apparent to those skilled in the art how the several forms of the present invention may be embodied in practice.

With the present invention, it is possible to adjust the position of the light source with respect to the collimating lens in the optical axis direction, after bonding the collimating lens to the collimating lens base member with high precision or fixing it with another element in advance. Accordingly, it is possible to maintain the positional relationship between the light source and the collimating lens even after performing a positional adjustment, without any influence by a displacement of the collimating lens caused by curing of the adhesive, vibrations or the like, after the positional adjustment.

In addition, the light source unit has a structure with which the positional adjustment can be performed on a plane approximately perpendicular to the optical axis and the light source unit can be secured relative to the collimating lens base member via the light source supporting member. Accordingly, it is possible to readily perform an optical axis adjustment, independently of the positional adjustment between the light source and the collimating lens in the optical axis direction.

Furthermore, in the present invention, the optical axis direction adjusting member is placed between the light source unit and the collimating lens base member. In other words, the optical axis direction adjusting member is placed on a space that is optically necessary anyway, and therefore it is possible to reduce the overall size and part count of the apparatus.

In the above-mentioned light source apparatus according to the present invention, it is preferable that a circuit board including at least a portion of a driving circuit of the light source is coupled to the light source unit, and the light source, the light source supporting member, and the circuit board are coupled together integrally. With this configuration, it is possible to mount the light source directly to the circuit board, without requiring a signal cable such as a flexible cable. This makes it possible to decrease the number of new components such as a flexible cable and reduce the electrical resistance and the capacitance of the signal line, thus preventing degradation of the response speed of the semiconductor laser (light source) that is driven at high speed. Additionally, it is also possible to prevent component failures such as a solder detachment and electrostatic breakdown of the semiconductor laser during the transportation process of half-finished products or the assembling process of the light source apparatus.

Furthermore, it is preferable that the collimating lens is mounted to the collimating lens base member with an adhesive, and the collimating lens is supported to the collimating lens base member by heat-treating the collimating lens base in a state in which a portion of the adhesive is cured.

Furthermore, it is preferable that the optical axis direction adjusting member is an adjusting member that is screwed to the collimating lens base member and is movable in the optical axis direction by its rotation, and includes a tool receiving portion for receiving a tool inserted from a direction transverse to the optical axis direction to perform adjustment of the position of the light source with respect to the collimating lens in the optical axis direction. With this configuration, the optical axis direction adjusting member moves only after the optical axis direction adjusting member is rotated. Therefore, the light source supporting member will not be deformed in the optical axis direction only by engaging a tool to the optical axis direction adjusting member. Accordingly, for example, when the light source is moved excessively forward during moving the light source back and forth, the rotation of the adjusting member may be simply returned by an amount corresponding to the excessive movement, so that it is possible to complete the adjustment operation in a shorter time with a higher precision, as compared to the related art method in which the adjusting member is rotated while exerting a force in the optical axis direction.

Furthermore, it is preferable that a portion of the optical axis direction adjusting member that is in contact with the light source supporting member has an annular portion enveloping an outer circumference of the light source. With this configuration, even if the space in which the optical axis direction adjusting member is exposed is narrow, it is possible to insert an adjusting tool having a small thickness to this space, and causing the adjusting tool to fit to the optical axis direction adjusting member from a direction intersecting the optical axis. This makes it possible to rotate the optical axis direction adjusting member easily. That is, although the space for exposing the optical axis direction adjusting member is limited to a narrow space when the optical axis direction adjusting member is placed in a space that is optically necessary inherently as in the present invention, it is possible to perform the adjustment operation easily even in such a case.

Furthermore, since the adjustment of the position in the optical axis direction is performed by pressing the light source supporting member such that the screw of the light source adjusting member surrounds the light source, it is possible to suppress an optical axis displacement resulting from a rotation moment generating when rotating the screw of the light source adjusting member. Furthermore, since the contact area between the light source supporting member and the screw of the light source adjusting member is large, it is also possible to achieve the effect of suppressing the vibrations of the light source caused by vibrations from the outside.

It is preferable that an outer circumference of the annular portion has a polygonal shape, or a groove is formed in the annular portion.

Furthermore, it is preferable that the optical axis direction adjusting member is screwed to the collimating lens base member, and a portion of the optical axis direction adjusting member that is in contact with the light source supporting member has an outer diameter larger than an outer diameter of a portion of the optical axis direction adjusting member that is screwed to the collimating lens base member. With this configuration, in the case of mounting the optical axis direction adjusting member to the collimating lens base member, the screw may be rotated until the screw portion of the optical axis direction adjusting member is completely embedded into the collimating lens base member, so that the operation is very simple. As long as a certain level of the dimensional accuracy is achieved for the stepped portion of the screw and the lens base member, it is possible to secure a certain amount of distance in the optical axis direction upon completion of the assembly operation, thereby reducing the number of manhours for the adjustment even further.

Further, when the contact area between the optical axis direction adjusting member and the light source supporting member is small, the area of the optical axis direction adjusting member that is in contact with the light source supporting member may undergo creep deformation, changing the distance in the optical axis direction over time. However, the area of the contacting portion is large in the structure of the present invention, so that it is possible to reduce the degradation of the materials due to creep, and use a variety of materials. In addition, having a wider choice of materials has the effect of preventing a focus position displacement caused by expansion and contraction of the collimating lens base member when the temperature inside the apparatus fluctuates. That is to say, a wider choice in changing the material makes it possible to select a material capable of solving the influence of linear expansion and the problem of creep at the same time.

In the above-described configurations according to the present invention, the optical axis direction adjusting member is placed between the light source unit and the collimating lens base member. Therefore, a fluctuation in the distance between the collimating lens and the light source is caused by a combination of the deformation of the collimating lens base member and that of the optical axis direction adjusting member. Accordingly, it is possible to take measures against the focus displacement by changing the material of the optical axis direction adjusting member, which has a smaller and simpler structure than that of the collimating lens base member.

It is preferable that the light source unit is secured relative to the collimating lens base member, after adjustment of the position of the light source with respect to the collimating lens in the optical axis direction. In this configuration, the light source unit is further fixed to the collimating lens base member after adjusting the position of the light source in the optical axis direction. This makes it possible to prevent the light source unit from vibrating and the optical axis adjustment from being shifted due to vibrations of the elastic portion of the light source supporting member when the vibrations or impact forces inside the apparatus are transmitted to the light source apparatus. Furthermore, by adopting this configuration, it is also possible to mount a horizontal synchronization detection sensor to the light source unit, thus making it possible to provide an even smaller and less expensive light source apparatus.

It is preferable that the light source unit is secured with an anaerobic ultraviolet curing resin. With this configuration, it is possible to complete the curing in a short time for the major portion of the adhesive, to which ultraviolet light can be applied, and performs anaerobic curing for the gaps between the metallic components, to which ultraviolet light cannot be applied, thus performing curing reliably.

It is preferable that the light source unit has at least one positioning hole for performing a positional adjustment of the light source in a plane approximately perpendicular to the optical axis. With this configuration, it is possible to further simplify the optical axis adjustment between the light source unit and the collimating lens base member. Although a positioning pin or the like is fitted into the positioning hole of the light source unit at the time of the optical axis adjustment, it is preferable to secure a space in which the light source unit can be moved backward even in a state in which the positioning pin is fitted.

It is preferable that the positioning hole is electrically insulated from a source voltage of the light source. In many light sources, the flange portion is electrically connected to the source voltage of the light source, and the light source supporting member is charged at the same potential. When the positioning hole is electrically insulated from the source voltage of the light source, it is possible to prevent breakdown of the light source, the power source for lighting the light source, the driving circuit and the like due to current leakage. Preferably, the positioning hole is electrically grounded at a ground level equivalent to that of the source voltage of the light source.

It is preferable that a circuit board including at least a portion of a driving circuit of the light source is coupled to the light source unit, and the positioning hole is formed in the circuit board. This configuration facilitates electrical insulation and also reduces the cost.

It is preferable that the collimating lens base member is made of an electrically insulating material. With this configuration, the collimating lens base member is not charged at the source voltage of the light source, so that it is possible to obviate troubles that could have been caused by current leakage. It is preferable to select a resin plastic as the electrically insulating material, since this makes it possible to reduce the mass production cost and also achieve reduction in weight of the component.

It is preferable that the light source supporting member is smaller than the circuit board, both vertically and horizontally. With this configuration, it is possible to prevent a leakage fault caused by an operator touching the light source supporting member by mistake during the adjustment operation.

It is preferable that the light source supporting member includes an elastic deformation portion and a fixing portion for fixing to the circuit board, and the elastic deformation portion and the fixing portion are arranged such that they are not arranged in a row. With this configuration, the deformation energy of the elastic deformation portion will not propagate to the bonding portion, so that it is possible to suppress loosening of the bonding portion and the deformation force exerted on the circuit board.

It is preferable that an intermediate electric signal line is connected to a driving circuit of the light source. With this configuration, by guiding the intermediate electric signal line to the outside of the outer jacket of the optical scanning apparatus, and fixing a portion of the intermediate electric signal line to the optical scanning apparatus, it is possible to prevent the external force generated when connecting the electric signal line from extending to the light source during incorporating this optical scanning apparatus to a printing apparatus, thus preventing the optical axis from being displaced.

It is preferable that the light source supporting member has a natural oscillation frequency that is higher than a rotational frequency of a scanning apparatus mounted to an optical scanning apparatus to which the light source apparatus is mounted. With this configuration, it is possible to lower jitter generated by resonance of the light source caused by vibrations of the scanning apparatus.

It is preferable that at least one of the light source apparatus and an optical scanning apparatus to which the light source apparatus is mounted includes a hybrid lens in which a diffraction grating is incorporated into a refractive lens, a perimeter flange portion of the light source is press-fitted and fixed to the light source supporting member in the light source unit, and the light source supporting member has a thickness that is at least half a thickness of the perimeter flange portion of the light source. With this configuration, it is possible to reduce the cost of the collimating lens by using a diffraction grating for the resin lens, which is of low cost but has a large wavelength dispersion and a large refractive index fluctuation due to a temperature change. Moreover, by optimizing the thickness of the light source supporting member, it is possible to suppress wavelength drift due to self-heating of the semiconductor laser during emission, thus improving the reliability at low cost.

It is preferable that at least one of the light source apparatus and an optical scanning apparatus to which the light source apparatus is mounted includes a hybrid lens in which a diffraction grating is incorporated into a refractive lens, and at least one of an optical axis alignment of the light source, a distance adjustment in the optical axis direction, and a final inspection of the optical scanning apparatus are performed, while the light source is continuously pulsed. With this configuration, it is possible to reduce the cost of the collimating lens by using a diffraction grating for the resin lens, which is of low cost but has a large wavelength dispersion and a large refractive index fluctuation due to a temperature change. Moreover, by pulsing the light source during adjustment of the light source, the wavelength fluctuation due to heat generation is suppressed, so that it is possible to reduce adjustment errors during the adjustment.

In the above-described optical scanning apparatus, it is preferable that a hybrid lens in which a diffraction grating is incorporated into a refractive lens is mounted; and the light source is continuously pulsed during an assembly adjustment and an inspection of the optical scanning apparatus.

It is preferable that the light source apparatus is mounted in an outer jacket, an intermediate electric signal line that is guided to the outside of the outer jacket is connected to a driving circuit of the light source, and a portion of the intermediate electric signal line is fixed. With this configuration, it is possible to prevent the external force generated when connecting the electrical signal line from extending to the light source during incorporating the optical scanning apparatus into a printing apparatus, thus preventing the optical axis from being displaced.

It is preferable that the light source supporting member has a natural oscillation frequency that is higher than a rotational frequency of the scanning apparatus. With this configuration, it is possible to lower jitter generated by resonance of the light source caused by vibrations of the scanning apparatus.

It is preferable that a hybrid lens in which a diffraction grating is incorporated into a refractive lens is included, a perimeter flange portion of the light source is press-fitted and fixed to the light source supporting member in the light source unit, and the light source supporting member has a thickness that is at least half a thickness of the perimeter flange portion of the light source. With this configuration, it is possible to reduce the cost of the collimating lens by using a diffraction grating for the resin lens, which is of low cost but has a large wavelength dispersion and a large refractive index fluctuation due to a temperature change. Moreover, by optimizing the thickness of the light source supporting member, it is possible to suppress wavelength drift due to self-heating of the semiconductor laser during emission, thus improving the reliability at low cost.

In the above-described method for adjusting a light source apparatus, it is preferable that the collimating lens is bonded to the collimating lens base member with an adhesive, and the collimating lens is secured relative to the collimating lens base member by temporarily curing the adhesive and thereafter heat-treating the collimating lens base member on which the collimating lens has been bonded.

It is preferable that securing the light source unit to the collimating lens base member is performed after (a).

It is preferable that at least one of the light source apparatus and an optical scanning apparatus to which the light source apparatus is mounted includes a hybrid lens in which a diffraction grating is incorporated into a refractive lens, and at least one of an optical axis alignment of the light source, a distance adjustment in the optical axis direction and a final inspection of the optical scanning apparatus is performed, while the light source is continuously pulsed.

In the above-described method for producing an optical scanning apparatus according to the present invention, it is preferable that the optical scanning apparatus includes a hybrid lens in which a diffraction grating is incorporated into a refractive lens, and at least one of an assembly adjustment and an inspection of the optical scanning apparatus is performed, while the light source is continuously pulsed.

Hereinafter, embodiments of the present invention are described in detail with reference to the accompanying drawings. It should be noted that the same components and corresponding parts having the same configuration or function in the drawings are denoted by the same reference numerals, and the description thereof are not repeated.

EMBODIMENT 1

Figure 1B:
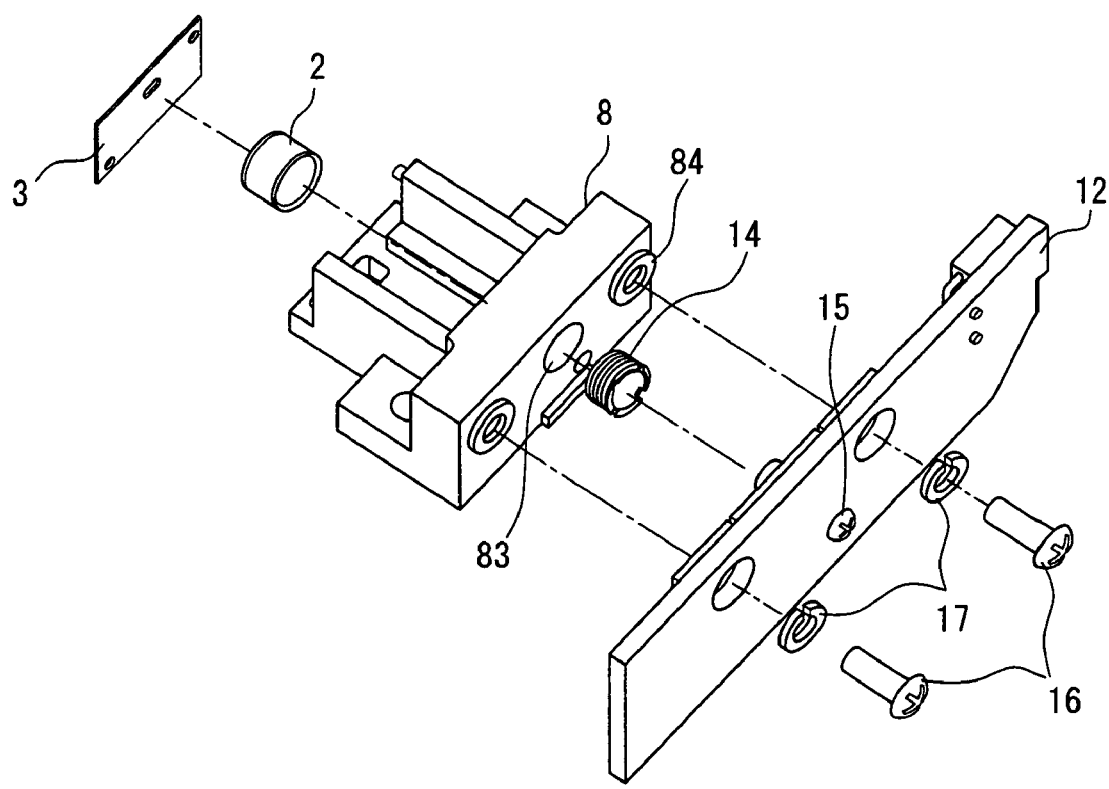
FIG. 1B is a perspective view of the light source apparatus according to Embodiment 1 of the present invention, as viewed obliquely from the back.

FIGS. 1A and 1B show exploded perspective views of a light source apparatus according to Embodiment 1 of the present invention. FIG. 1A is a perspective view, as viewed obliquely from the front, and FIG. 1B is a perspective view, as viewed obliquely from the back. The light source apparatus shown in FIGS. 1A and 1B is provided with a collimating lens unit 50 and a light source unit 51. The collimating lens unit 50 is provided with a collimating lens base 8, a collimating lens 2, a diaphragm 3 and an adjusting screw 14. The light source unit 51 is configured by fastening a light source supporting plate 13, to which a light source 1 is fixed, to a circuit board 12 with a fixing screw 15. The collimating lens unit 50 and the light source unit 51 are fastened with fixing screws 16.

Figure 2A:
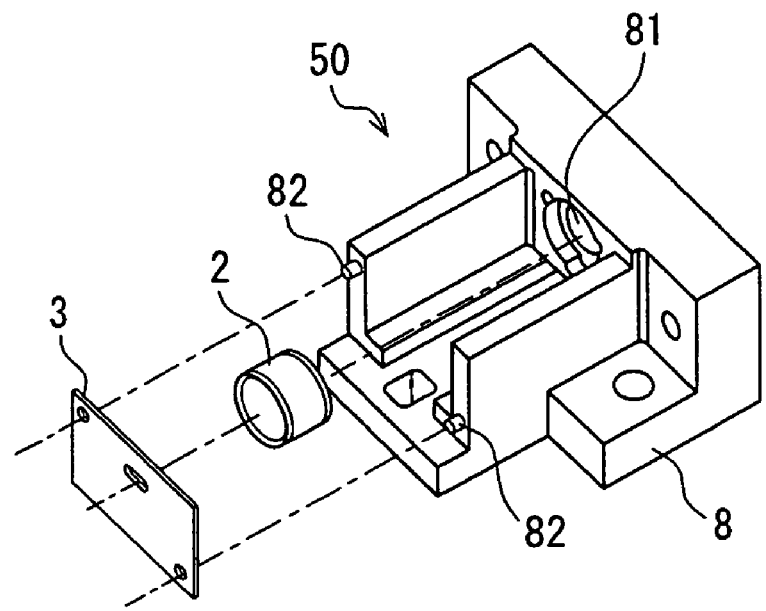
FIG. 2A is a perspective view illustrating the assembly of a collimating lens unit 50 according to Embodiment 1 of the present invention.
Figure 2B:
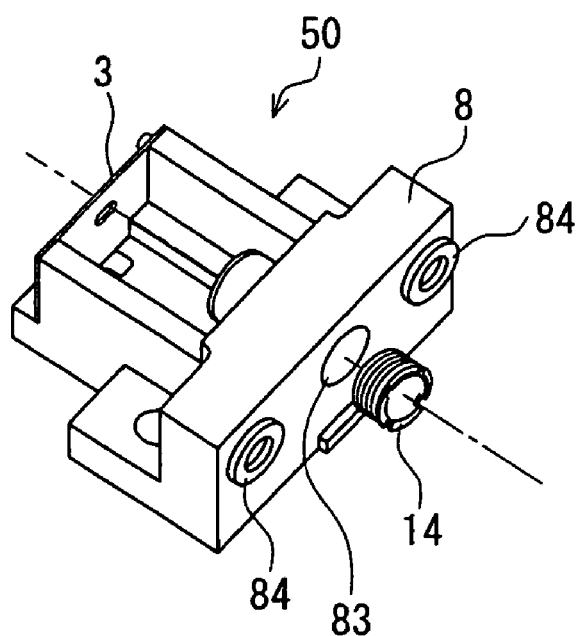
FIG. 2B is a perspective view showing the collimating lens unit 50 according to Embodiment 1 of the present invention after completion of the assembly.

The detailed structure of this light source apparatus is described below, while explaining its assembly procedure. FIGS. 2A and 2B are perspective views illustrating the assembly of the collimating lens unit 50. The collimating lens 2 is bonded and fixed to a collimating lens fitting hole 81, which is provided in the front surface of the collimating lens base 8. Diaphragm positioning projections 82 of the collimating lens base 8 are inserted into holes formed in the diaphragm 3 to position the diaphragm 3, and the diaphragm 3 is bonded and fixed to the collimating lens base 8. As shown in FIG. 2B, the adjusting screw 14 is screwed to an internal thread portion 83 provided in the rear of the collimating lens base 8, thus completing the collimating lens unit 50.

Figure 3A:
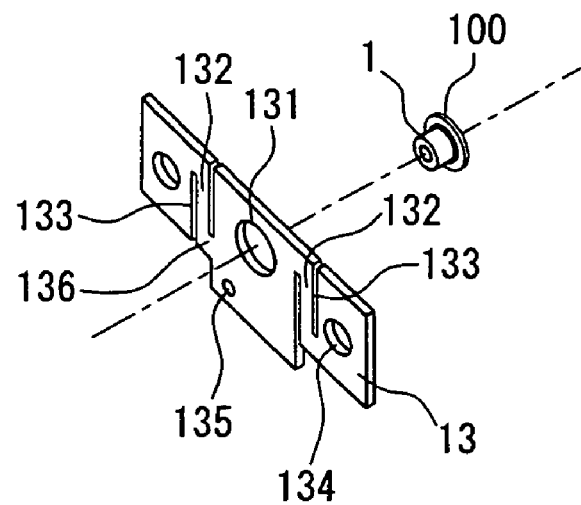
FIG. 3A is a perspective view illustrating the assembly of a light source 1 and a light source supporting plate 13 according to Embodiment 1 of the present invention.
Figure 3B:
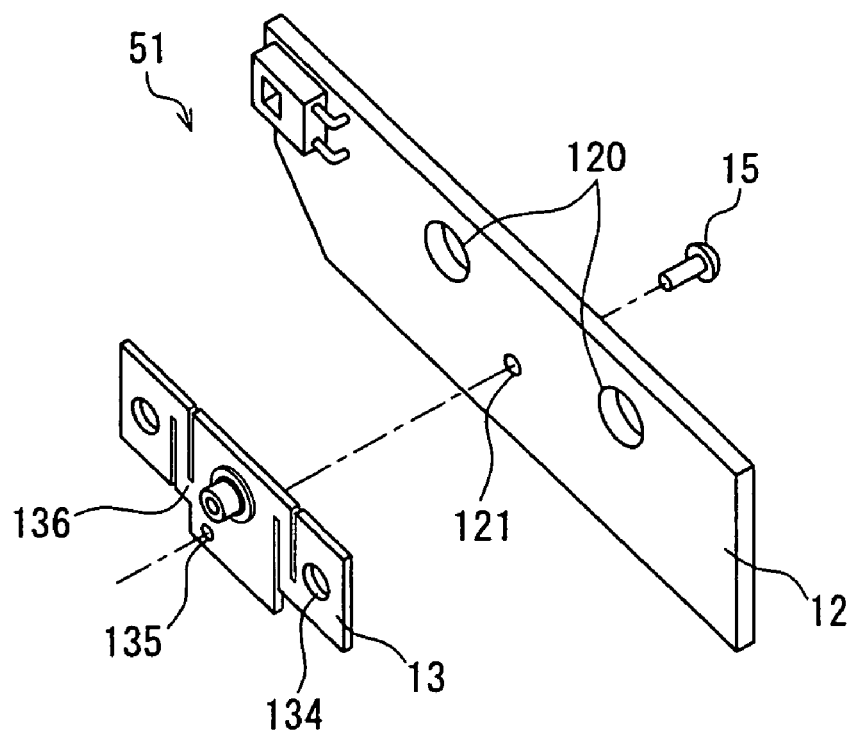
FIG. 3B is a perspective view illustrating the assembly of a light source unit 51 according to Embodiment 1 of the present invention.

FIGS. 3A and 3B are perspective views illustrating the assembly of the light source unit 51. As shown in FIG. 3A, a flange portion 100 of the light source 1 is press-fitted and fixed to a light source flange press-fitting hole 131 formed in the light source supporting plate 13. An electric signal terminal (not shown) of the light source 1 that has been press-fitted and fixed to the light source supporting plate 13 is soldered to the circuit board 12, and, as shown in FIG. 3B, the circuit board 12 and the light source supporting plate 13 are fastened together by tightening the fixing screw 15 from behind the circuit board 12, thus completing the light source unit 51.

Figure 4A:
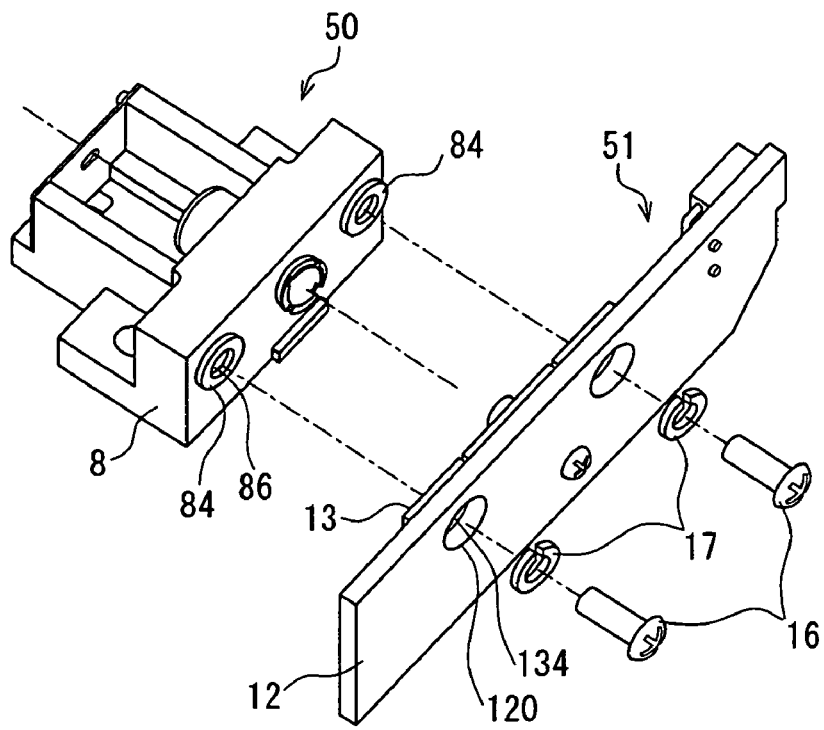
FIG. 4A is a perspective view illustrating the temporary assembly of the collimating lens unit 50 and the light source unit 51 according to Embodiment 1 of the present invention.
Figure 4B:
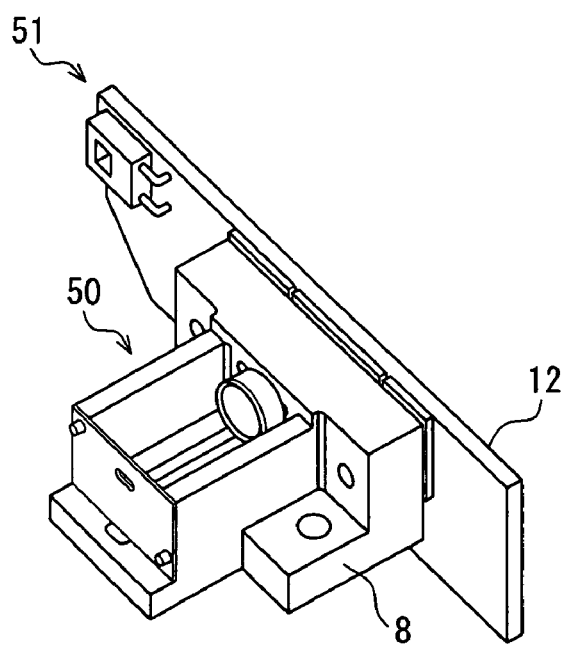
FIG. 4B is a perspective view showing the collimating lens unit 50 and the light source unit 51 according to Embodiment 1 of the present invention, after completion of the temporary assembly.

FIGS. 4A and 4B are perspective views illustrating a temporary assembly of the collimating lens unit 50 and the light source unit 51. As shown in FIG. 4A, the fixing screws 16 are inserted into holes 120 of the circuit board 12 and holes 134 of the light source supporting plate 13, and fastened to internal thread portions 86 formed on bearing surface projections 84 of the collimating lens base 8 via spring washers 17. Consequently, as shown in FIG. 4B, the light source unit 51 is fixed to the collimating lens unit 50, thus completing the temporary assembly of the light source apparatus.

The diameter of the holes 120 of the circuit board 12 is larger than the diameter of the head of the fixing screws 16. Furthermore, the diameter of the holes 134 of the light source supporting plate 13 is larger than the thread diameter of the fixing screws 16. Consequently, the circuit board 12 to which the light source 1 is mounted can be moved in a plane perpendicular to the optical axis by loosening the fixing screws 16, so that it is possible to move the light source 1 vertically and horizontally.

In the foregoing, an outline of the assembly of the light source apparatus has been described. In the following, each assembly step, components used and the like are described in detail.

FIGS. 5A and 5B are diagrams illustrating a mounting and fixing step of the collimating lens 2. FIG. 5A is a top view in the mounting and fixing step of the collimating lens 2, and FIG. 5B is a diagram showing the collimating lens base 8 in FIG. 5A, as viewed from an optical axis inspection camera 42. When bonding the collimating lens 2 to the collimating lens base 8, the collimating lens base 8 is mounted and fixed to an optical axis inspection jig, and thereafter the collimating lens 2 is inserted into a lens fitting hole 81 (FIG. 5B) of the collimating lens base 8.

As shown in FIG. 5A, the optical axis inspection jig includes an inspection light source 40, an optical axis inspection lens 41 and an optical axis detection CCD camera 42, and is operable to apply laser light to the collimating lens 2 and confirming whether the optical axis error of the lens is within an adjustable range. If there are any defective collimating lenses 2 and collimating lens bases 8, then those components can be removed from the mass production line at this point.

Thereafter, as shown in FIG. 5B, a predetermined amount of an ultraviolet curing adhesive (not shown) is dropped onto adhesive pools 85 provided in three locations around the lens fitting hole 81 of the collimating lens base 8, and thereafter a predetermined amount of ultraviolet light having a predetermined illuminance is applied from the collimating lens 2 side, thereby curing the adhesive.

Similarly, while confirming the positional error of the diaphragm 3 with the optical axis inspection jig, the diaphragm 3 is mounted to the collimating lens base 8, and a cold setting adhesive is applied to the diaphragm positioning projection 82 of the collimating lens base 8, and left still for a certain period, thereby fixing the diaphragm 3 (see FIGS. 2A and 2B).

In this embodiment, a polycarbonate resin containing 30 wt % of a glass filler was used for the collimating lens base 8, and a stainless steel plate SUS 304 was used for the diaphragm 3. A LOCTITE 3105 was used as the ultraviolet curing adhesive, and ultraviolet light was applied at an illuminance of 40 mW/cm$^2$ for 45 seconds.

However, when the collimating lens 2 is left as it is after ultraviolet light irradiation, the position of the collimating lens 2 may move slightly. This is due to the fact the photopolymerization reaction of the ultraviolet curing adhesive slightly proceeds also after ultraviolet light irradiation. The degree of this greatly varies depending on the irradiation intensity and the irradiation time of ultraviolet light, the amount and the depth of the adhesive, and the like. In addition, there are various factors for the variation, including, for example, fluctuations of the temperature and humidity environment in the factory, the lot of the adhesive, the temporal change of the adhesive after unsealing, and a decrease in the light amount of an ultraviolet light generating apparatus.

Therefore, a half-finished collimating lens unit 50 is introduced into a high temperature bath at 70° C. and left still for 24 hours. By letting the half-finished products be left still at a high temperature for a certain period of time, the polymerization reaction of the ultraviolet curing adhesive is accelerated, and residual additives and the like are removed, thus stabilizing bonding of the collimating lens 2. Performing a heat treatment for stabilizing the adhesive after temporarily fixing the adhesive in advance under conditions in which the adhesive is stabilized to some extent and thereafter mounting the light source in this way is a more rational approach than examining each one of the various factors for the variation and managing them at the manufacturing location as described above.

After the half-finished product is left still in the high temperature bath for a certain period of time, curing of the adhesive that has been applied to fix the diaphragm 3 also is completed at the same time. When the type of the adhesive is changed for some reason, the standing temperature and time may be optimized. In the case of using a resin molded product as the collimating lens base 8, letting the collimating lens unit 50 be left still at a high temperature for a certain period of time also has the effect of reducing the internal stress during molding.

Since the size of the molded component slightly changes when the residual stress is released, it is preferable to set the standing temperature to a temperature that is higher than the temperature of the optical scanning apparatus in actual use, or the temperature at which the optical scanning apparatus is transported or stored so that the size of the collimating lens base 8 will not change after shipment.

FIGS. 6A and 6B are conceptual diagrams showing a state immediately after dropping an adhesive 60 onto adhesive pools after inserting the collimating lens 2 into a lens hole (FIG. 6A), and a state after the adhesive 60 has been cured (FIG. 6B). In general, after curing, the volume of an adhesive is smaller than before curing. Accordingly, after curing, compressive stress is exerted on the collimating lens 2 in the direction indicated by the arrow in FIG. 6B. The adhesive pools 85 are provided at the lens insertion hole formed in the collimating lens base 8 at three locations in contact with the cylindrical surface of the collimating lens 2 (see FIG. 5B).

That is to say, when the collimating lens 2 is bonded and fixed to the collimating lens base 8 in the structure of this embodiment, the collimating lens 2 is pressed against the bottom surface of the lens hole formed in the collimating lens base 8 and fixed at the position. This effect is prominent for an adhesive that undergoes a large volume decrease during curing. Here, when the volume decrease rate during curing the adhesive is $\alpha k$, the rate by which the volume of the adhesive increases with temperature is $\alpha t$ and the volume expansion rate during expansion under a high humidity environment is $\alpha h$, an adhesive for which both Expressions (1) and (2) below hold is suitable as the adhesive of this embodiment.

$$\alpha k > \alpha t \qquad \text{Expression (1)}$$

$$\alpha k > \alpha h \qquad \text{Expression (2)}$$

Although the above-described adhesive was selected in this embodiment, there is no limitation to this, and it is possible to use any adhesive that achieves a sufficient bonding strength between the collimating lens base 8 and the collimating lens 2 and for which both Expressions (1) and (2) hold.

Figure 7A:
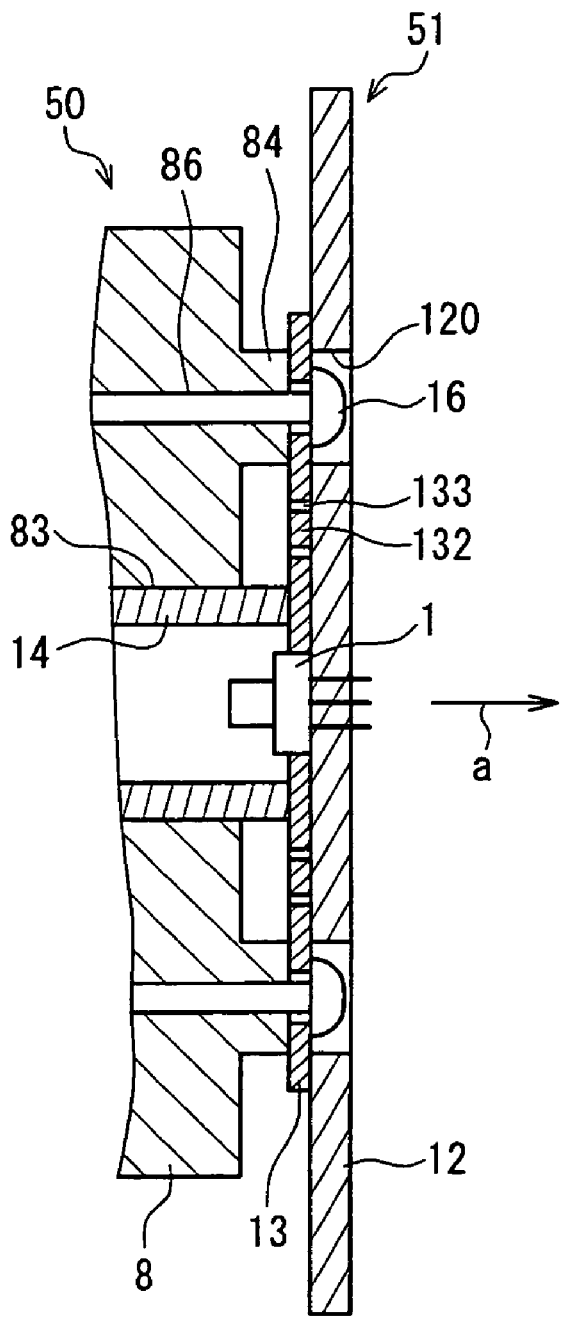
FIG. 7A is a cross-sectional view showing a light source supporting plate 13 according to Embodiment 1 of the present invention in a state in which the light source supporting plate 13 has not been elastically deformed.
Figure 7B:
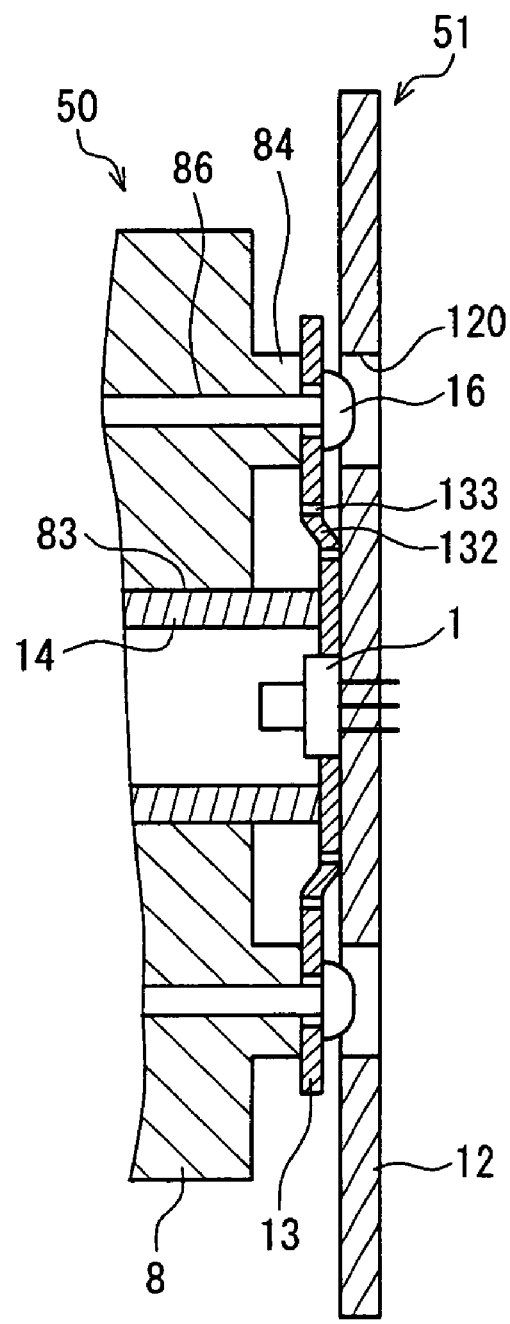
FIG. 7B is a cross-sectional view showing the light source supporting plate 13 according to Embodiment 1 of the present invention in a state in which the light source supporting plate 13 has not elastically deformed.

FIGS. 7A and 7B show cross-sectional views showing the circuit board 12 being fixed to the collimating lens base 8. FIG. 7A is a cross-sectional view showing a state in which the light source supporting plate 13 has not been elastically deformed, and FIG. 7B is a cross-sectional view showing a state in which the light source supporting plate 13 has been elastically deformed by being pressed by the adjusting screw 14.

As shown in FIG. 7A, the light source supporting plate 13 is mounted to the collimating lens base 8 via the projections 84 provided on the collimating lens base 8. Consequently, a gap is formed between the bearing surface of the collimating lens base 8 on which the projections 84 are formed and the light source supporting plate 13. As shown in FIGS. 10A and 10B, it is possible to adjust the rotation of the adjusting screw 14 by inserting an adjusting tool 18 into this gap.

Furthermore, the height of the projections 84 of the collimating lens base 8, the length of the internal thread portion 83 and the total length of the adjusting screw 14 are decided such that the adjusting screw 14 will not touch the light source supporting plate 13 when the adjusting screw 14 is screwed to the internal thread portion 83 of the collimating lens base 8 to be moved to the collimating lens 2 side maximally. The purpose is to prevent elastic force from being exerted between the light source supporting plate 13 and the adjusting screw 14 when fastening the light source unit 51 to the collimating lens unit 50 with the fixing screws 16 for temporary assembly.

In this embodiment, a polycarbonate containing 30 wt % of glass fibers was used for the adjusting screw 14. In order to suppress fluctuations in the focal length caused by a difference in deformation between the collimating lens base 8 and the adjusting screw 14 when the temperature and humidity environment of the light source apparatus fluctuates, the same material was selected for the collimating lens base 8 and the adjusting screw 14.

It should be noted that the material for the collimating lens base 8 and the adjusting screw 14 is not limited to this, and it is possible to select general-purpose engineering plastics such as a modified polyphenylene ether, polybutylene terephthalate and polyethylene terephthalate, glass fiber-reinforced grade thermoplastic resins thereof, as well as thermosetting resins such as unsaturated polyester and melamine resin.

However, in the case of mass production, even if the same material is used, an orientation of the resin, for example, may occur during molding and the two components may have different temperature-humidity characteristics. In the configuration of this embodiment, the fluctuation in the distance between the collimating lens 2 and the light source 1 occurs as a result of a combination of the deformation of the collimating lens base 8 and that of the adjusting screw 14.

Therefore, it is possible to address such a fluctuation by altering the material of the adjusting screw 14 (for example, increasing the glass content or changing the material), instead of correcting both the collimating lens base 8 and the adjusting screw 14. Particularly, since the adjusting screw 14 is a small cylindrical member having a simple structure, the orientation during modifying the resin is more stable than that of the collimating lens base 8, even if the material is changed.

When a similar problem occurs in related art apparatuses, the material of the component corresponding to the collimating lens base 8 and its molding conditions must be optimized. In contrast, in the case of the light source apparatus according to this embodiment, only the material and the molding conditions for the adjusting screw 14, which has a small and simple structure, may be altered, so that it is possible to shorten the period from prototyping to mass production.

Here, the distance adjustment for the light source 1 is described with reference to FIGS. 7A and 7B. In the state shown in FIG. 7A, the tip surface of the adjusting screw 14 is in contact with the light source supporting plate 13, but the adjusting screw 14 does not press against the light source supporting plate 13. Accordingly, the entire light source supporting plate 13 maintains its flat plate shape. It should be noted that in FIGS. 7A and 7B, the magnification is changed from that illustrated in FIGS. 1A and 1B, and illustration of some of the components is omitted in order to facilitate the understanding of the distance adjustment of the light source 1.

By rotating the adjusting screw 14 from the state shown in FIG. 7A using the tool 18 (see FIGS. 10A and 10B), the tip surface of the adjusting screw 14 can be moved to the light source supporting plate 13 side. At this time, the light source supporting plate 13 is pressed in the direction indicated by the arrow a. On the other hand, the light source supporting plate 13 is fixed to the collimating lens base 8 with the fixing screws 16. Accordingly, portions of the light source supporting plate 13 that surround the fixing screws 16 are kept fixed to the collimating lens base 8.

Next, slits 133 are formed on both lateral sides of the press-fitting hole 131 (see FIG. 3A). The slits 133 serve to reduce the rigidity of the light source supporting plate 13 to facilitate elastic deformation of the light source supporting plate 13. Consequently, when the light source supporting plate 13 is pressed in the direction indicated by the arrow a as shown in FIG. 7A, elastic deformation portions 132 are deformed, so that portions of the light source supporting plate 13 that fix the light source 1 located between the left and light elastic deformation portions 132 will be displaced in the direction indicated by the arrow a.

This state is shown in FIG. 7B. As can be seen from a comparison between FIGS. 7A and 7B, portions of the light source supporting plate 13 that surround the fixing screws 16 are not displaced at all, whereas portions thereof that fix the light source 1 are displaced in the direction indicated by the arrow a due to the deformation of the elastic deformation portions 132. Along with this displacement, the circuit board 12, which is fixed to the light source supporting plate 13 with the fixing screw 15 (FIG. 3B), is also displaced in the direction of the arrow a. That is, it is possible to displace the light source supporting plate 13 and the circuit board 12, which fix the light source 1, by rotating the adjusting screw 14, thus making it possible to perform the distance adjustment of the light source 1.

Next, the light source unit will be described in detail. The light source supporting plate 13 is formed by a stainless steel plate (SUS 304), and is provided with the press-fitting hole 131 for press-fitting the light source 1, as shown in FIG. 3A. As described above, the elastic deformation portions 132, which correspond to beams, are deformed at the time of adjusting the distance of the light source 1. At this time, unless the deformation is prevented from extending to the internal thread portion 135, deformation energy is exerted on the circuit board 12, thus causing problems such as a solder detachment in the circuit or press-fitting displacement of the light source 1.

In this embodiment, as shown in FIG. 3A, the internal thread portion 135 is disposed at a position displaced downward with respect to the elastic deformation portions 132 such that the elastic deformation portion (beam) 132 and the internal thread portion 135 will not be arranged in a row in a horizontal direction. By arranging the elastic deformation portion 132, a connecting area 136 connecting the elastic deformation portion 132 to its adjacent area, and the internal thread portion 135 in this way such that they do not face each other, the elastic deformation of the elastic deformation portion 132 is prevented from propagating to the fixing portion surrounding the internal thread portion 135, thus preventing generation of stress at the fixing portion.

The light source 1 is press-fitted and fixed to the hole 131 formed in the light source supporting plate 13. In the configuration of Japanese Patent No. 3077375 shown in FIGS. 27A to 27C, various screws and fixing plates are used to fix the light source to the light source supporting plate. However, mechanical press-fitting as in this embodiment is preferable, since it can reduce the number of man-hours and components. The same also applies to cases where bonding is carried out by welding or adhesion, instead of mechanical press-fitting.

As described above, in this embodiment, the light source supporting plate 13 to which the light source 1 has been press-fitted and bonded is fixed to the circuit board 12 with the fixing screw 15, thereby completing the light source unit 51 (see FIG. 3B). In this case, a double-sided circuit may be adopted in order to reduce the size of the circuit board 12. Since the flange portion of the semiconductor laser (light source 1) has a potential of 5 V, it is necessary to provide insulation between the circuit board 12 and the light source supporting plate 13 when using a double-sided substrate, in order to prevent an electrical short circuit.

In this embodiment, insulation is provided by interposing a polyethylene terephthalate sheet having a thickness of 100 µm between the circuit board 12 and the light source supporting plate 13 (not shown). The insulating material is not limited to this, and polymeric materials such as polyethylene, acryl, polyolefin, polypropylene, polycarbonate, polyimide and polyarylate, materials such as a mineral, including, for example, mica, and the like may be selected as appropriate.

Among them, a polyethylene terephthalate film, a polyimide sheet and the like are preferable in view of change over time such as migration when they are left still under a high temperature and high humidity environment, cost, availability and so on.

When a power source is connected to the semiconductor laser serving as the light source, the flange portion of the semiconductor laser has a potential equal to the potential of the power source (5 V), as described above. Accordingly, the light source supporting plate 13 also has a potential of 5 V. If a conductive material such as a metal such as aluminum, iron or stainless steel, or a material that has been provided with conductivity by filling a metallic filler into a resin is selected as the material of the collimating lens base 8, then the collimating lens base 8 also has a potential of 5 V through the light source supporting plate 13.

When the optical axis adjustment or the distance adjustment is carried out in such a state, the power source for the light source, the semiconductor laser or the laser driving circuit may be broken by current leakage caused when the operator touches the light source supporting plate 13 or the collimating lens base 8 by mistake. This may occur because the operator forgets to turn off the power source for driving the light source when removing the light source apparatus for which adjustment has been completed from the inspection apparatus, or, conversely, when attaching such a light source apparatus. This is dangerous because the leaked current is passed through the body of the operator, so that the operator receives an electric shock.

Such an accident can be avoided if, for example, the operator wears insulating gloves. Conversely, however, the semiconductor laser and the circuit board 12, which are vulnerable to static electricity, may be broken by insulating gloves that are charged. Therefore, it is preferable that the collimating lens base 8 includes an insulating resin as in this embodiment. It is further preferable that the light source supporting plate 13 is made smaller than the circuit board 12 such that the light source supporting plate 13 will not project vertically or horizontally from the circuit board 12. By doing so, the entire circumference of the light source supporting plate 13 that is charged at 5 V is covered by the insulating material, which makes it difficult for the operator to touch the light source supporting plate 13 and thus prevents accidents from occurring.

Figure 8:
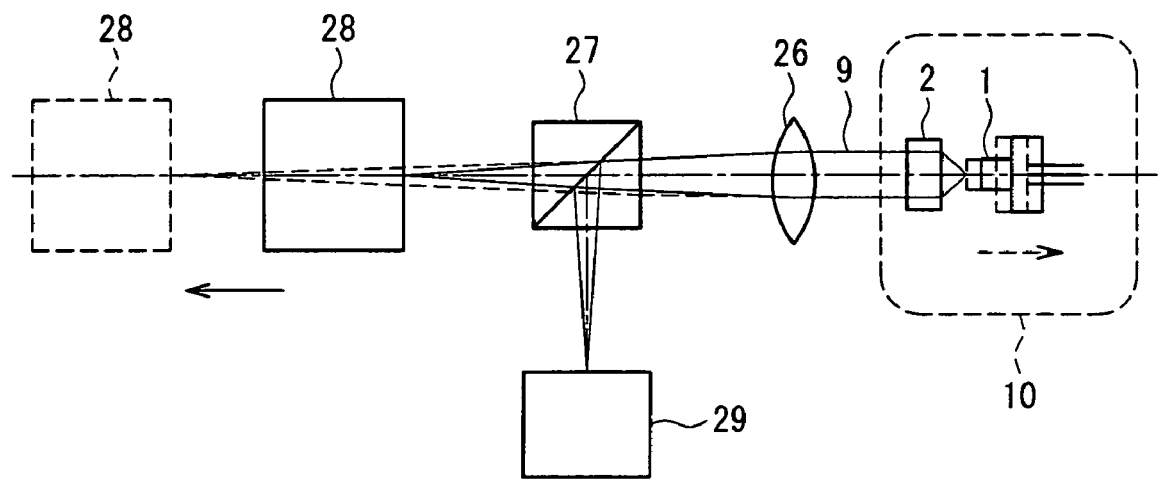
FIG. 8 is a diagram showing an overall configuration of a light source adjustment jig according to Embodiment 1 of the present invention.

FIG. 8 is a diagram schematically showing a configuration of an optical adjustment jig according to the present invention. The light source apparatus 10, which has been assembled by the above-described assembling step, adjusts the optical axis and the position of the light source in the optical axis direction, using this optical adjustment jig. The optical adjustment jig is provided with a light source apparatus mounting portion (not shown), a light source light-emission control circuit (not shown), an achromatic lens 26, a beam splitter 27, an optical axis direction inspection apparatus (CCD camera) 28 and a beam diameter measuring apparatus 29.

The light source 1 is mounted to the light source apparatus mounting portion, and the light source light-emission control circuit and the circuit board 12 of the light source 1 are connected to emit the light source 1. A laser light beam 9 is converted into a substantially parallel light beam by the collimating lens 2, and this beam is shaped by passing through the diaphragm (not shown). The light beam that has passed through the diaphragm is converted into convergent light beams at the achromatic lens 26, and branched into two light beams at the beam splitter 27 which includes a half mirror.

The CCD camera 28 and the beam diameter measuring apparatus 29 are disposed respectively on the side of the light beam traveling straight ahead and the side of the light beam that has been bent at a right angle at appropriate positions that are calibrated with high accuracy. A BeamScan (Model-3088 from Photon, Inc.) was used as the beam diameter measuring apparatus 29. An achromatic lens having a focal length of 120 mm was used as the achromatic lens 26, and a collimating lens 2 having a focal length of 9 mm was used as the collimating lens 2. Accordingly, in this embodiment, the lateral magnification is 13.3 times, and the longitudinal magnification is 177 times.

In the following, the procedure of an optical adjustment using this optical adjustment jig is described. First, the optical axis is adjusted. At this point, the adjusting screw 14 of the light source apparatus is not in contact with the light source supporting plate 13, and the light source 1 is disposed at a position that is slightly closer to the collimating lens 2 than its predetermined position. In this embodiment, the difference between this position and the predetermined position of the light source 1 is set to 0.3 mm. Accordingly, by multiplying 0.3 mm, which is the amount of the positional displacement on the light source 1 side, by the longitudinal magnification 177, it can be seen that in this state, the focus position of the beam that has passed through the achromatic lens 26 is displaced by as much as about 53 mm at the regular position of the CCD camera 28.

Since the beam diameter observed on the CCD camera 28 is large and the center of the optical axis is not clear, the errors in the optical axis adjustment will increase if this state remains as it is. Therefore, a linear motion slider (not shown) is attached to the CCD camera, and the CCD camera 28 is moved in the arrow direction to a location that is in best focus in this state (the position of the CCD camera 28 that is indicated by the dotted line in FIG. 8). While confirming the optical axis with the CCD camera 28, the fixing screws 16, which are fixing the light source supporting plate 13 to the collimating lens base 8, are loosened slightly (see FIG. 1B). Thereafter, the light source supporting plate 13 is moved, together with the circuit board 12, in a plane perpendicular to the optical axis to cause the optical axes to coincide, and the fixing screws 16 are tightened again, which completes the adjustment of the optical axis.

Figure 9A:
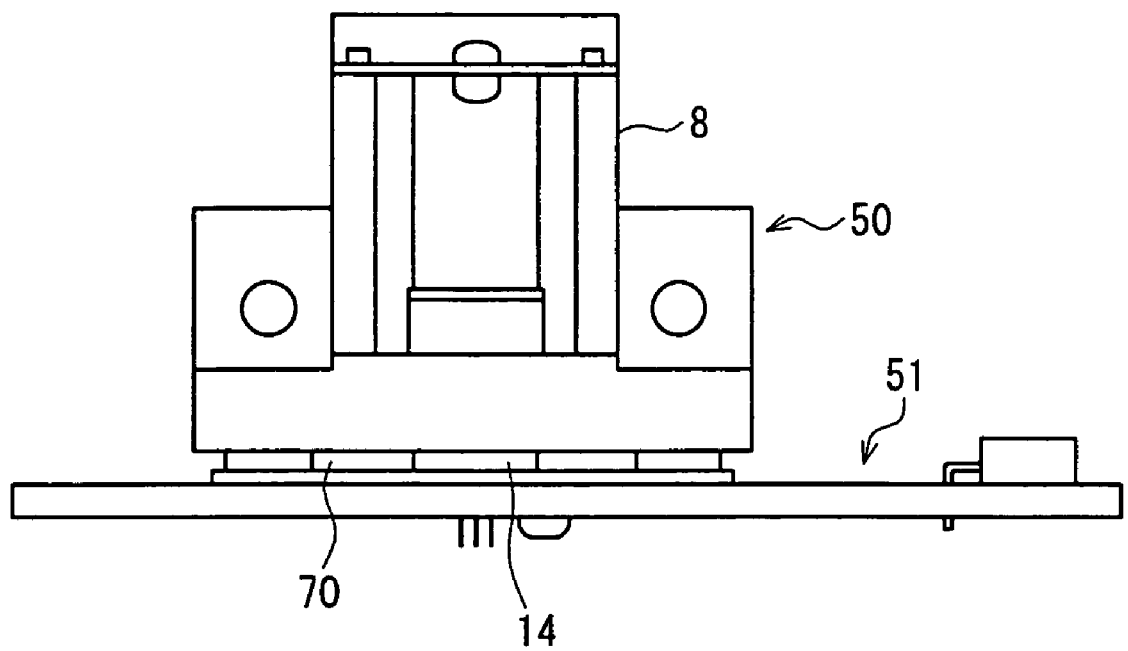
FIG. 9A is a top view showing a gap between the light source unit 51 and the collimating lens unit 50 according to Embodiment 1 of the present invention.
Figure 9B:
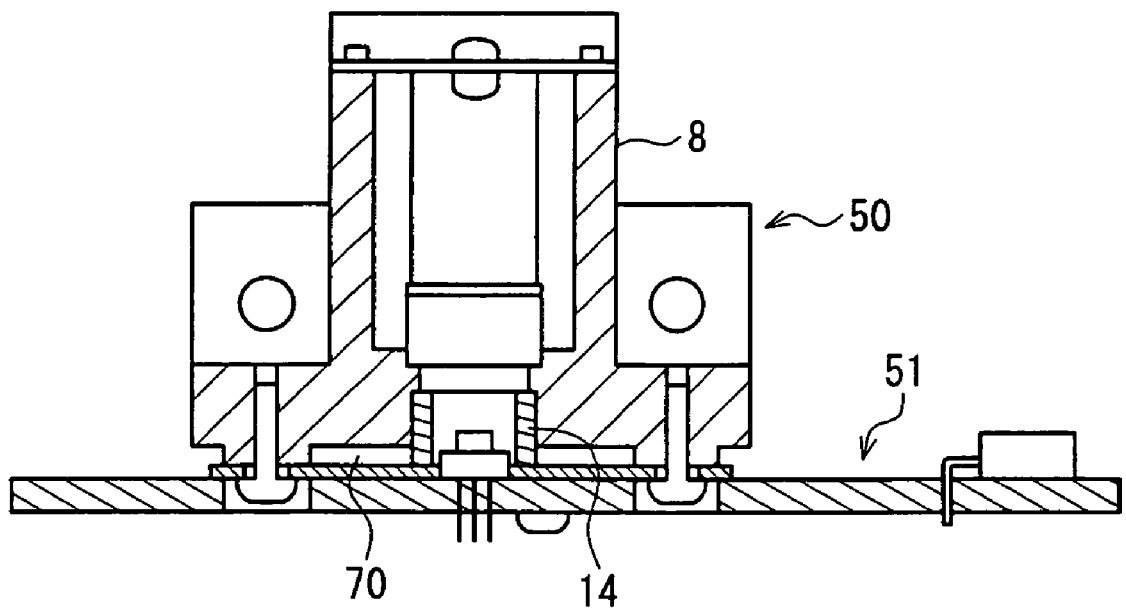
FIG. 9B is a cross-sectional view of FIG. 9A.

FIGS. 9A and 9B are diagrams showing the gap between the light source unit 51 and the collimating lens unit 50. FIG. 9A is a top view, and FIG. 9B is a cross-sectional view. When the adjustment of the optical axis is completed, the position of the light source 1 is adjusted by inserting the adjusting tool 18 into a gap 70 and rotating the adjusting screw 14.

FIG. 10A shows a state in which the adjusting tool 18 is inserted into the gap 70, and FIG. 10B shows how the tip of the adjusting tool 18 is engaged with the adjusting screw 14 to rotate the adjusting screw 14. As described with reference to FIGS. 7A and 7B, the position of the light source 1 is adjusted by rotating the adjusting screw 14 such that the adjusting screw 14 is moved towards the light source supporting plate 13.

As can be seen from the illustration in FIG. 7A, the gap into which the adjusting tool 18 can be inserted is determined by the height of the projections 84 formed on the collimating lens base 8. In this embodiment, the height of the projections 84 is set to 0.8 mm, and the adjusting tool 18 was formed into a shape forming a hook 181 as shown in FIG. 10B, using a stainless steel plate having a thickness of 0.5 mm. The handle (not shown) of the adjusting tool 18 that is gripped by the operator is made insulating by covering it with resin.

As shown in FIG. 10B, grooves (slits) 141 for allowing the hook 181 to be inserted are formed at four locations in the adjusting screw 14. This allows the adjusting screw 14 to be rotated freely. At the time of adjusting the distance in the optical axis direction, it is preferable to return the linear motion slider of the CCD camera 28 shown in FIG. 8 to its regular position (the position of the CCD camera that is indicated by the solid line in FIG. 8), and monitor the beam diameter value indicated by the beam diameter measuring apparatus, while monitoring the displacement of the optical axis at the same time.

In the case of a light source unit that has been assembled normally, the optical axis will not be displaced when moving the adjusting screw 14 backward. However, during a mass production, the optical axis may be displaced slightly in some occasions when the light source supporting plate 13 has been bent by rotating the adjusting screw 14 to bring the light source supporting plate 13 completely into close contact with the adjusting screw 14. The main reason for this is a low precision of press-fitting of the light source 1 to the light source supporting plate 13, or warping of the light source supporting plate 13.

In that case, the optical axes can be made coincident again by slightly loosening the fixing screws 16 to reduce the reaction force caused by bending of the light source supporting plate 13, and moving the circuit board 12 in this state to move the light source supporting plate 13, which moves together with the circuit board 12, in a plane perpendicular to the optical axis. The first reason why such an adjustment is possible is that the contact area between the adjusting screw 14 and the light source supporting plate 13 is large, and therefore their contact is stable. The second reason is that the spring washers 17 are interposed to the fixing screws 16 for fixing the light source unit 51 to the collimating lens unit 50 (FIG. 1B), so that even if the rotating angles for loosening the two fixing screws 16 are greatly different, the spring washers 17 absorb the difference, thus preventing the light source supporting plate 13 from being inclined with respect to the adjusting screw 14.

Further, when the rotating angle is made too large by mistake when rotating the fixing screws 16 in the direction in which they are loosened, the light source supporting plate 13 integrated with the circuit board 12 becomes completely loose from the collimating lens base 8, so that the optical axis is displaced significantly. This is prevented by increasing the stroke of the fixing screws 16 by placing the spring washers 17 on the fixing screws 16.

As shown in FIGS. 10A and 10B, the adjusting screw 14 can be rotated from a direction intersecting the optical axis. Therefore, in this embodiment, the light source will not be moved simply by putting the rotating tool 18 for the adjusting screw 14 to the adjusting screw 14. That is, the light source is moved only after rotating the rotating tool 18. Accordingly, the adjusting screw 14 may be returned to its original state if it is rotated too much, and therefore there is no hysteresis in the adjustment of the position of the light source in the optical axis direction, and the adjustment step will be completed in a short period of time.

Furthermore, the adjusting screw 14 has a hollow shape enveloping the light source and its tip surface is annular. With this shape, it is possible to reduce the rotation moment that is exerted on the light source supporting plate 13 when pressing the light source supporting plate 13 with the adjusting screw 14. This prevents the optical axis from being displaced when moving the light source. It should be noted that the tip surface of the adjusting screw 14 may have any ring-like shape, and the shape is not limited to circular and may be polygonal.

Incidentally, when there is any play (clearance) in the fitting between the external thread portion and the internal thread portion of the adjusting screw 14, the light source supporting plate 13 may be inclined by an amount corresponding to the thread play when the adjusting screw 14 is rotated during the optical axis adjustment, thus displacing the optical axis. Therefore, the clearance between the external thread and the internal thread of the adjusting screw 14 preferably is as small as possible. On the other hand, a certain amount of clearance is necessary for fitting the screw.

Figure 27A:
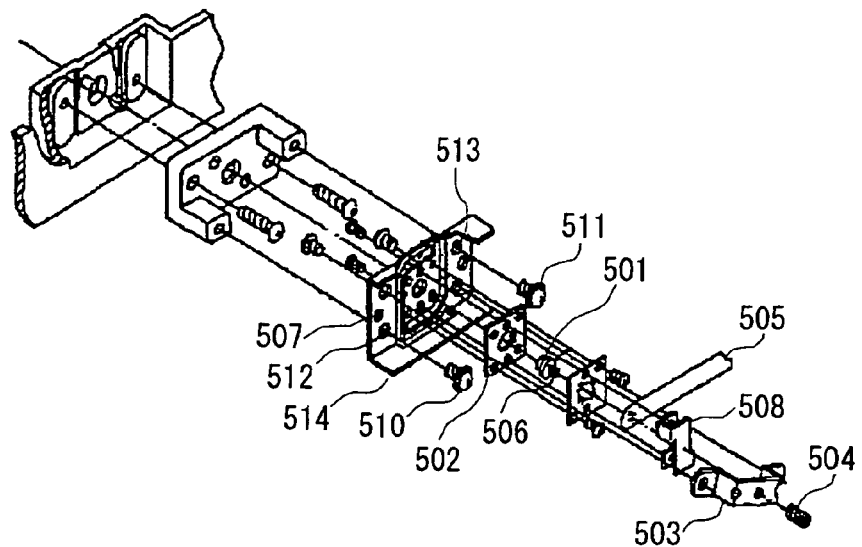
FIG. 27A is an exploded perspective view showing an example of a distance adjustment of a related art light source apparatus.
Figure 27B:
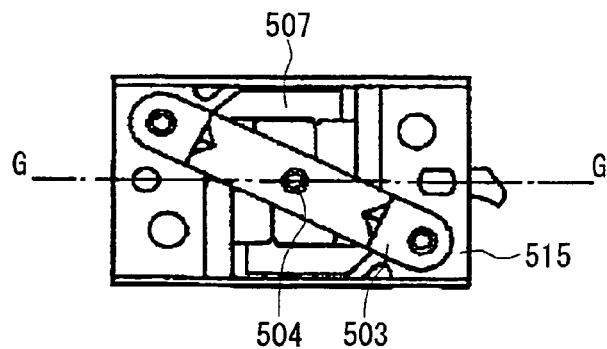
FIG. 27B is a rear view of the light source apparatus shown in FIG. 27A.
Figure 27C:
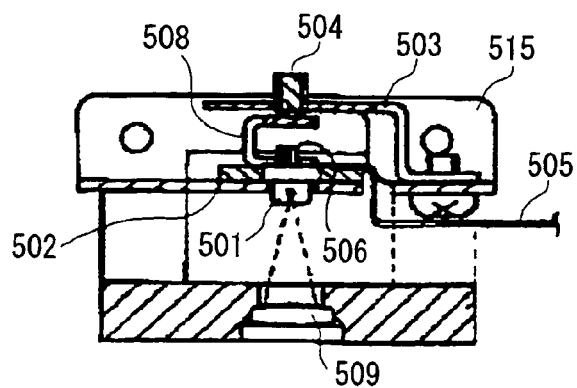
FIG. 27C is a cross-sectional view taken along the line G-G in FIG. 27B.

When a similar play due to such a necessary clearance is present in the related art example shown in FIGS. 27A to 27C and in this embodiment, the optical axis will be displaced sensitively in a case in which a conventional general-purpose screw as shown in FIGS. 27A to 27C is used. In contrast, in this embodiment, the adjusting screw 14 has a hollow annular shape enveloping the light source, so that the optical axis displacement (inclination angle) due to such a play can be made smaller than in the related art example.

Furthermore, the structure of this embodiment allows the adjusting screw to be inserted into a block of the collimating lens base 8 having a sufficient thickness to secure a longer screw fitting length. Accordingly, it is possible to further suppress the proportion of the influence exerted on the position and the inclination of the screw as a whole by play at various areas during the fitting of the screw, and decrease the optical axis displacement (inclination angle) even further than in the related art example.

That is, when there is play between an internal thread and an external thread, the center axis of the screw is shifted to one direction in its cross section. For example, when a rod inserted into a cylindrical hole is inclined in the hole owing to a clearance between the hole and the column, the angle of the inclination is determined by that play (clearance) and the length of the column. Likewise, when the external thread of the adjusting screw is inclined in the internal thread, the angle of the inclination is determined by that play (clearance) and the screw fitting length. Accordingly, the optical axis error in the light source can be expressed as follows.

optical axis error=(play [clearance])÷(screw fitting length)×(LSU optical magnification)

Accordingly, the allowable play (clearance) can be determined as follows.

allowable play=optical axis error×screw fitting length÷LSU optical magnification Therefore, when a screw fitting length of 5 mm can be secured for a commonly required allowable error of 0.2 mm in optical axis displacement and a common LSU lateral magnification of 20 times, the allowable play will be 0.05 mm (50 μm). In this case, it is possible to suppress the optical axis displacement within an allowable range even if a clearance of up to 50 μm is secured.

Since it is possible to secure a long screw fitting length in this embodiment in this way, a desired gap between the external thread and the internal thread is, for example, 50 μm or less, so that it is possible to increase the tolerance for the clearance as compared to the related art apparatuses. In other words, it is possible to make the optical axis displacement (inclination angle) at a comparable clearance even smaller than in the related art apparatuses.

Further, since the area of the contacting portion between the adjusting screw 14 and the light source supporting plate 13 can be increased, it is possible to reduce the compressive stress exerted on the adjusting screw 14, thus preventing creep deformation from occurring when the adjusting screw 14 is left still under a high temperature environment over years. Although an example in which a BeamScan is used for the beam diameter measurement was described in this embodiment, it is also possible to directly measure the beam diameter using the CCD camera.

The position and the posture of the light source apparatus according to this embodiment are maintained by the adhesion between the light source supporting plate 13 and the adjusting screw 14. In such a state, vibrations and impact forces from the outside may cause the spring elastic portion of the light source supporting plate 13 to vibrate, thus causing jitter and color drift.

The rotational oscillation of the polygon motor has the most significant influence on the optical scanning apparatus. Further, in the present light source apparatus, the member having the lowest oscillation frequency is the light source supporting plate 13. The oscillation frequency with the largest amplitude that is transmitted from the polygon motor is the reciprocal of a single rotational period of the polygon motor.

This is because the causes of the oscillations are the eccentricity of the polygon mirror, the motor bearing or the rotor, the magnetic force distribution of the magnet or the coils of the rotor, and the like, and most of the oscillations due to these causes correspond to a single rotational period of the motor. Further, the above-mentioned causes often exert an influence with their phases shifted against one another. Accordingly, with the present configuration, it is possible to suppress the resonance phenomena by designing the light source supporting plate 13 such that its natural frequency is greater than the rotational frequency of the motor.

An example is described in which the present optical scanning apparatus is incorporated into a printing apparatus of 600 dpi (=24 line/mm). When the paper feeding speed is 100 mm/sec, the number of scanning lines per second is about 2400. When a hexagonal motor is selected as the polygon mirror, the number of revolutions of the polygon motor is 400 cycle/sec. That is, it is possible to suppress the resonance phenomena by designing the light source supporting plate 13 such that its natural oscillation frequency is greater than 400 Hz.

Light source supporting plates 13 having varied thicknesses were produced, and their respective natural frequencies were determined using CAD software (COSMOS/Works). The produced light source supporting plates 13 were each mounted to the optical scanning apparatus, and the relationship between the fluctuation amounts (jitter) of the lines printed by the printing apparatus while rotating the polygon motor was examined.

The light source supporting plates 13 had five different thicknesses, namely, 0.2, 0.5, 0.8 and 1.0 mm. The results are shown in Table 1. As is clear from the results in Table 1, the jitter increased when the natural frequency of the light source supporting plate 13 was lower or equivalent to the rotational frequency (400 Hz) of the polygon motor, whereas the jitter improved when the natural frequency was designed to be greater than the rotational frequency of the polygon motor.

TABLE 1

| thickness of light source supporting plate | 0.2 mm | 0.5 mm | 0.8 mm | 1.0 mm |
|---|---|---|---|---|
| resonance frequency Hz | 370 Hz | 920 Hz | 1440 Hz | 1770 Hz |
| image jitter | poor | good | good | good |

In order to improve the jitter even further, an anti-vibration adhesive may be dropped onto the gap between the holes 120, which are formed in the circuit board 12 for accommodating the heads of the fixing screws 16, and the fixing screws 16 (see FIG. 7A) and thereafter cured, after completion of the distance adjustment of the light source 1. When an adhesive is selected whose rigidity determined by its hardness and applied amount is sufficiently smaller than the rigidity of the light source supporting plate 13, the optical axis and the distance in the optical axis direction will not fluctuate due to the curing and the volume reduction of the anti-vibration adhesive.

Bonding the fixing screws 16, the circuit board 12 and the light source supporting plate 13 solves not only the problem of jitter, but also the problem of loosening of the fixing screws 16, so that it is possible to prevent the long-term deterioration of the apparatus. Examples of the adhesive include an ultraviolet light curing adhesive, an instantaneous adhesive, a hot-melt adhesive, a cold setting (solvent-volatile) adhesive, a thermosetting adhesive and an anaerobic adhesive, and the first three types of adhesives are preferable in terms of shortening the cycle time (steps).

However, in a light source apparatus whose assembly adjustment has been completed, even if ultraviolet light is applied, the light will not reach the washer 17 portion of the fixing screws 16 and the area between the fixing screws 16 and the light source supporting plate 13. Further, instantaneous adhesives generate a gas and make the lens and the like turbid, and therefore are not suitable for use. Hot-melt adhesives have a high application temperature, and therefore are not suitable for the present light source apparatus, which uses a resin.

In this embodiment, an ultraviolet curing adhesive that is provided with anaerobic properties was selected. This type of adhesive is provided with the properties of an anaerobic adhesive, while being an ultraviolet light curing resin, and its curing reaction is accelerated in the presence of metal ions. In this embodiment, when ultraviolet light is applied after application of the anaerobic ultraviolet curing adhesive, the major portion, to which ultraviolet light can be applied, is cured in a short time. At the light source supporting plate 13 and the gap between the fixing screws 16 and the washers 17 and the like, where the ultraviolet light does not reach, the curing reaction proceeds without application of ultraviolet light, since all of these components are metal. Accordingly, use of the anaerobic ultraviolet curing adhesive is most suitable. While a Three Bond TB3060 was used in this embodiment, there is no limitation to this, and other similar products such as an ARONTITE BU from Toagosei, Co., Ltd., are available.

In addition, various modifications can be made to the shape of adjusting screw 14, as shown in FIGS. 11A and 11B. The portion with which the adjusting tool is engaged may be provided with grooves as shown in FIG. 11A, or may be formed to have a polygonal shape as shown in FIG. 11B. Furthermore, as shown in FIG. 11B, the portion with which the tool is engaged may have a larger diameter than the diameter of the threaded portion to provide a step, for example, thus increasing the area of the tip surface. Increasing the area of the tip surface will increase the contact area between the light source supporting plate 13 and the adjusting screw 14, and provides the effect of suppressing vibrations of the light source when vibrations and impact forces are exerted on the light source apparatus.

Furthermore, it is possible to decrease the stress generated in the adjusting screw 14 by the pressing force of the light source supporting plate 13, thus making it possible to prevent the adjusting screw 14 from undergoing creep deformation. That is, with the structure of this embodiment, the area of the contacting portion can be increased, so that it is possible to reduce the degradation of the material due to creep, and use a variety of materials.

Having a wider choice of materials is also effective in solving the problem of focus position displacement caused by expansion and contraction of the collimating lens base 8 when the temperature inside the apparatus fluctuates. When a resin material containing glass fibers is used for the collimating lens base 8, a desired linear expansion coefficient may not be achieved owing to the orientation of the glass fibers, depending on the molding conditions of the resin.

This tendency is prominent particularly when the molded product has a complex structure. In the structure of this embodiment, the parameter for determining the fluctuation amount of the distance between the collimating lens and the light source when a temperature fluctuation occurs is decided based on the difference in deformation between the collimating lens base 8 and the adjusting screw 14. If the collimating lens base 8, which is a molded product, has a linear expansion coefficient smaller than the estimated design value, then the material of the adjusting screw 14 may be changed to a material having a little larger linear expansion coefficient. Since the adjusting screw 14 has a simple cylindrical structure, it is easy to achieve reproducibility in molding, so that changing the material for the adjusting screw 14 is effective when the above-described problem occurs.

In a case where the light source is press-fitted and fixed to the light source supporting plate 13 as in this embodiment, when the thickness of the light source supporting plate 13 is reduced to about 0.3 mm or smaller, the holding thickness is too small and therefore the holding power weakens. In addition, from the viewpoint of prevention of an optical axis displacement during press-fitting, as well as the viewpoint of the holding power, the press-fitting thickness is preferably as large as possible.

On the other hand, the light source supporting plate 13 has elasticity, and serves to perform adjustment in the optical axis direction by deforming at the adjusting screw 14. Therefore, the light source supporting plate 13 needs to have moderate spring elasticity. The thickness of the flange portion of a commonly available semiconductor laser is 1.2 mm. However, an excessive thickness of the light source supporting plate 13 renders the rigidity too high, so that the light source supporting plate 13 cannot have spring elasticity, which is not suitable for the use of this embodiment.

The size of a common light source apparatus is from about 20 mm to about 40 mm, and therefore there is a limit to the securable length of the beam serving as the elastic deformation portion. Therefore, there is also a limit to the thickness of the light source supporting plate 13. In view of this, it is difficult to provide the light source supporting plate 13 with spring elasticity unless it has a thickness of at most 2 mm. Accordingly, in order to ensure both press fit precision and spring elasticity, the thickness of the light source supporting plate 13 is preferably at least 0.5 mm and at most 2 mm.

Figure 12A:
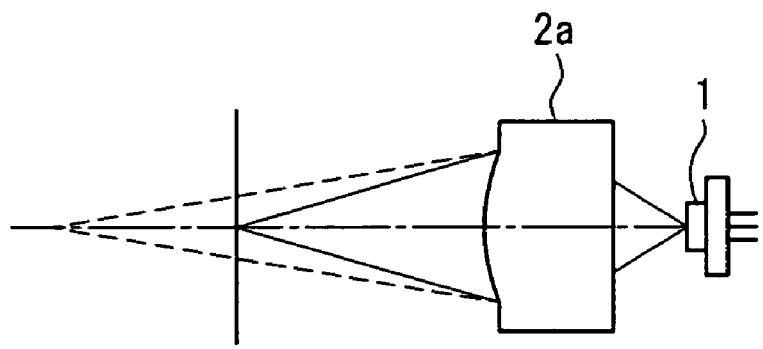
Figure 12B:
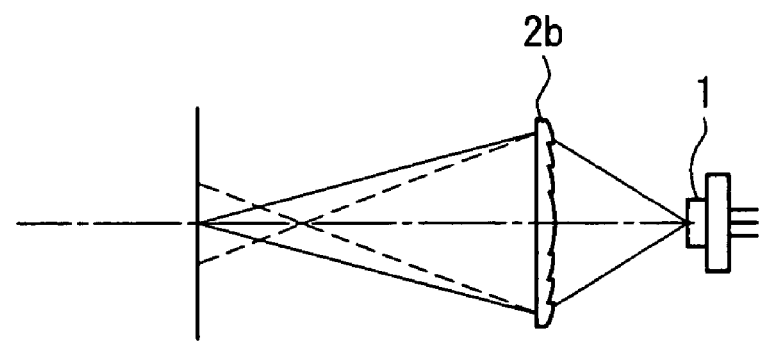
FIG. 12B is a diagram showing a fluctuation of the focus position due to the temperature change of a diffraction grating 2b.
Figure 12C:
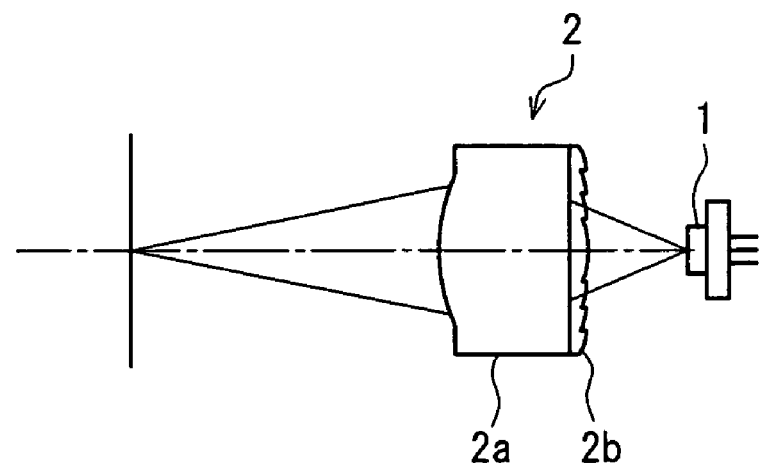
FIG. 12C is a diagram showing a temperature compensation in a hybrid lens.

Here, the collimating lens is described with reference to FIGS. 12A to 12C. FIGS. 12A to 12C show conceptual diagrams of the temperature compensation in a hybrid lens in which a refractive lens 2a and a diffraction grating 2b are combined. In this embodiment, a hybrid lens in which the diffraction grating 2b is formed on the surface of the refractive lens 2a using the lens shape and the refractive index is adopted as the collimating lens 2.

When the temperature of the lens increases, the shape of the lens surface changes with a decrease in the refractive index, which lowers the refraction. In other words, as shown by the broken line in FIG. 12A, the focus position on the image side becomes distant. On the other hand, the wavelength of the light from the light source 1 (semiconductor laser) increases with an increase in the temperature. In this case, the refraction at the diffraction grating 2b becomes smaller, and the focus position on the image side becomes closer, as viewed from the lens, as shown by the broken line in FIG. 12B. This embodiment adopts a design in which these two physical phenomena are successfully combined to prevent the focus position from fluctuating when the temperature inside the optical scanning apparatus fluctuates, as shown in FIG. 12C.

Although a resin lens has a greater linear expansion coefficient and undergoes a greater refractive index fluctuation due to the wavelength distribution of light and the temperature increase than a glass lens, use of a resin for the collimating lens is made possible by adopting the above-described design. Since a resin requires a shorter cycle time for molding than glass and can be produced with relatively small and light-weight production equipment, it is possible to reduce the cost.

Figure 13:
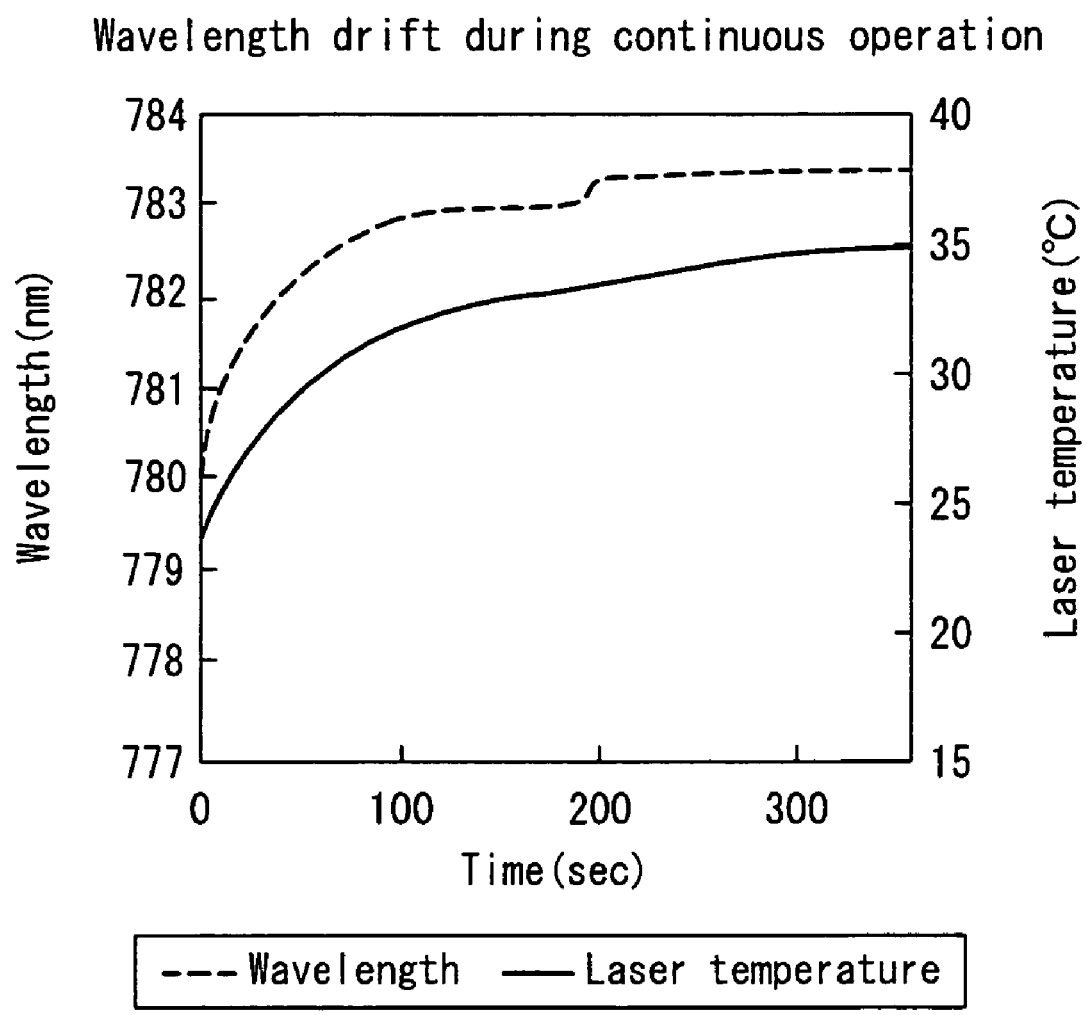
FIG. 13 is a graph showing a relationship between the wavelength drift and the temperature increase in the perimeter flange portion of the semiconductor laser when the semiconductor laser is continuously operated alone.

A cycloolefin polymer (ZEON Corporation) having a very small hygroscopicity was used as the lens material. However, in the case of using a hybrid lens, it is necessary to pay attention to the fact that a semiconductor laser undergoes self-heating when it is continuously operated. FIG. 13 shows a relationship between the wavelength drift and the temperature increase in the perimeter flange portion of the semiconductor laser when the semiconductor laser is continuously driven alone.

For the experiment, an infrared semiconductor laser (RLD-78NP) from ROHM CO., LTD. was used, and the emission output was set to 3.5 mW. The wavelength, which is 780 nm immediately after operating, drifts by about 3 nm after about five minutes. Therefore, use of the hybrid lens causes self-heating of the laser, thus displacing the focus. Normally, the adjustment of the light source apparatus or the inspection of the optical scanning apparatus is carried out while continuously operating the light source. However, it is not conceivable to turn on the light source for a long time in an actual printing apparatus. That is, in the case of introducing the hybrid lens, it is necessary to provide a way to suppress the self-heating of the laser during adjustment.

Figure 14:
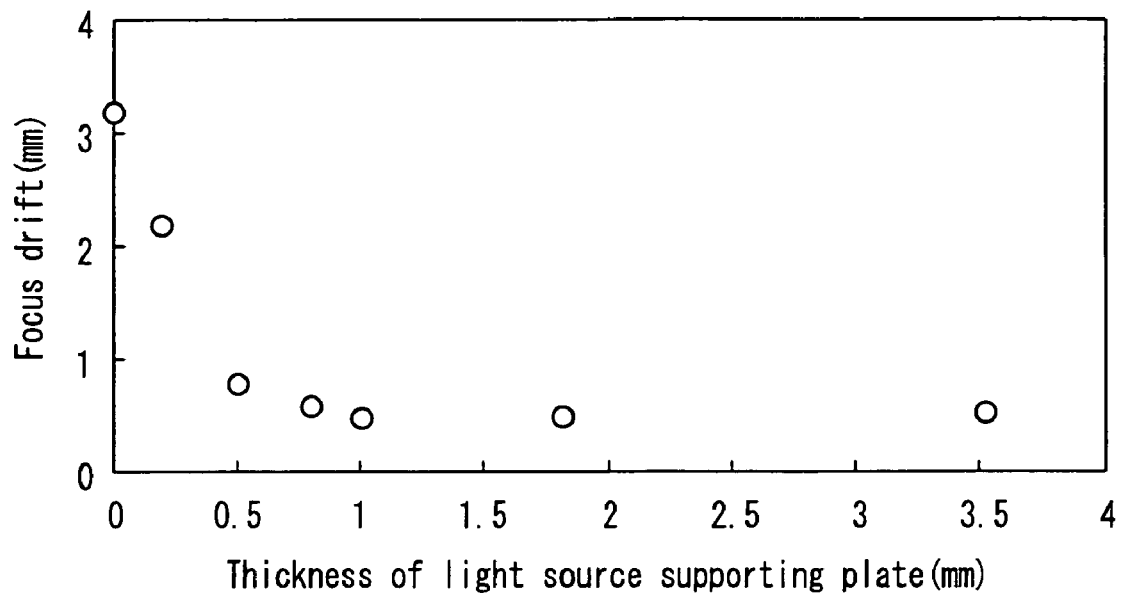
FIG. 14 is a graph showing a relationship between the focus position fluctuation and the thickness of the light source supporting plate 13 when the semiconductor laser is operated continuously.

Here, an optimum thickness of the light source supporting plate 13 is described further in terms of the above-described focus fluctuation due to self-heating of the laser when the laser is operated continuously. FIG. 14 shows a relationship between the focus position fluctuation and the thickness of the light source supporting plate 13 when the semiconductor laser is operated continuously.

Light source supporting plates 13 having six different thicknesses, namely, 0.2, 0.5, 0.8, 1.0, 1.8 and 3.5 mm were used, and the light source was press-fitted and fixed to each of the light source supporting plates 13. For comparison, the experiment was also performed on a light source fixed to the circuit board 12 with solder, without using the light source supporting plate 13. An infrared wavelength semiconductor laser (RLD-78NP) from ROHM CO., LTD was used as the light source, and the optical output was set to 3.5 mW.

In addition, as a measuring apparatus for measuring the focus fluctuation, the above-described light source adjustment jig was used (the configuration shown in FIG. 8). A hybrid lens incorporating the diffraction grating 2b as shown in FIG. 12C was used as the collimating lens 2, and the composite focal length of the diffraction portion and the refractive portion was set to 9 mm. The focal length of the achromatic lens 26 was set to 120 mm.

Figure 15:
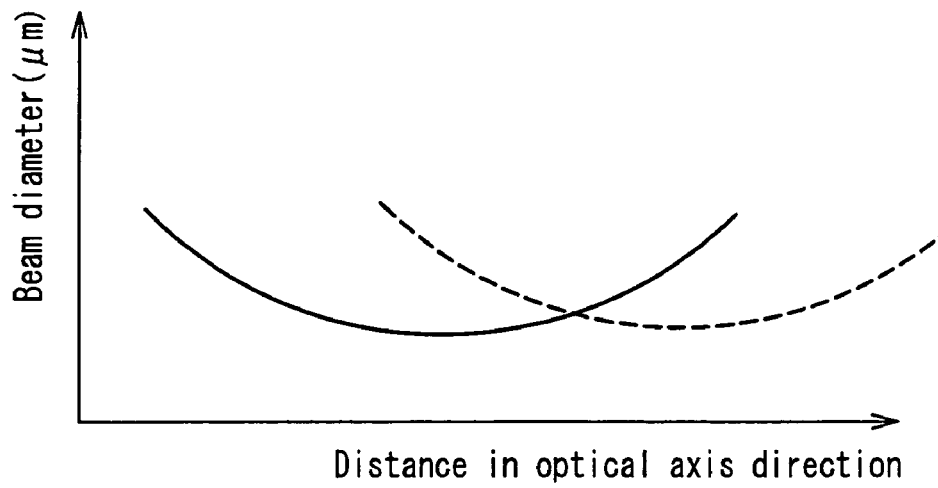
FIG. 15 is a graph showing how to obtain a value of focus position fluctuation.

The method for obtaining the value of the focus position fluctuation is described with reference to the schematic graph shown in FIG. 15. The beam diameter of condensed laser light is a function of the position in the optical axis direction. After mounting an X stage that is operable to provide fine position adjustment to the beam diameter measuring apparatus of FIG. 8 and continuously operating the light source for a sufficient time, the relationship between the beam diameter and the position in the optical axis direction (the solid line in FIG. 15) is obtained, while gradually moving the position of the beam diameter measuring apparatus.

Similarly, the laser is turned off for a sufficient time, and the relationship between the beam diameter and the position in the optical axis direction (the broken line in FIG. 15) immediately after turning off the laser is obtained this time. The amount of displacement in the optical axis direction between the solid line and the broken line in FIG. 15 is the amount of displacement of the focus position during continuously operating the light source. More specifically, the absolute value of the difference between the distance in the optical axis direction at which the beam diameter is smallest on the solid line and the distance in the optical axis direction at which the beam diameter is smallest on the broken line is the amount of displacement of the focus position during continuously operating the light source. This amount of displacement is the focus drift plotted on the vertical axis in FIG. 14.

For comparison, the data obtained when no light source supporting plate 13 was used is plotted as the point at which the thickness of the light source supporting plate 13 is zero in FIG. 14. As is clear from FIG. 14, when the thickness of the light source supporting plate 13 is increased, the focus position fluctuation during continuously operation of the light source can be reduced, and there is almost no difference in this effect among thicknesses equal to or larger than about 0.5 mm.

The thickness of the flange portion of a commonly available semiconductor laser is 1.2 mm, and the thickness of the flange of the laser used in this experiment is also 1.2 mm. Since the heat of a laser is transmitted through the flange portion, it can be said that in a case where the flange portion is press-fitted and fixed to the light source supporting plate 13 as in this embodiment, there is no significant difference in heat dissipation effect even if the light source supporting plate 13 having a thickness excessively larger than the thickness of the flange portion is used. Conversely, when the press-fitting length is small, the heat flux transmitted through the flange portion becomes dense and hence difficult to transmit. Therefore, in terms of heat dissipation, it is preferable to set the thickness of the light source supporting plate 13 to at least half the thickness of the flange of the laser. In addition, from the viewpoint of press-fitting and fixing the light source to the light source supporting plate 13, it is necessary to secure a certain thickness of the light source supporting plate 13.

However, as described above, the adjustment in the optical axis direction is carried out by bending the light source supporting plate 13 in the thickness direction of the light source supporting plate 13 in this embodiment. Therefore, an excessively large thickness of the light source supporting plate 13 provides an excessively high rigidity, so that it is difficult for the light source supporting plate 13 to have spring elasticity. A high rigidity also causes a large pressing force exerted on the adjusting screw 14, making it difficult to rotate the adjusting screw 14. Moreover, the stress at the adjusting screw 14 also increases, leading to creep deformation.

Furthermore, in view of the production process of the light source supporting plate 13, the thickness of the light source supporting plate 13 is preferably as small as possible, since a light source supporting plate 13 having a small thickness readily can be produced by press working or the like. Considering all these things, the thickness of the light source supporting plate 13 is preferably from at least half and at most twice the thickness of the flange portion of the light source.

In this embodiment, the focus position fluctuation due to the self-heating of the light source was described for a case in which a hybrid lens incorporating a diffraction grating was used as the collimating lens 2. However, a similar focus position fluctuation due to a temperature fluctuation more or less occurs by an influence of the wavelength dispersion of the lens material also in a collimating lens that does not include a diffraction grating.

On the other hand, the temperature increase of the light source has a significant influence on the reduction of the life of the light source. The optimum thickness of the light source supporting plate 13 shown in FIG. 14 indicates that the effect of suppressing the temperature increase is saturated at 0.5 mm or greater. Accordingly, by forming the light source supporting plate 13 with a minimum thickness, it is possible to provide both the flexibility and the anti-oscillation property that are required for the light source supporting plate 13, while suppressing the temperature increase.

Figure 19A:
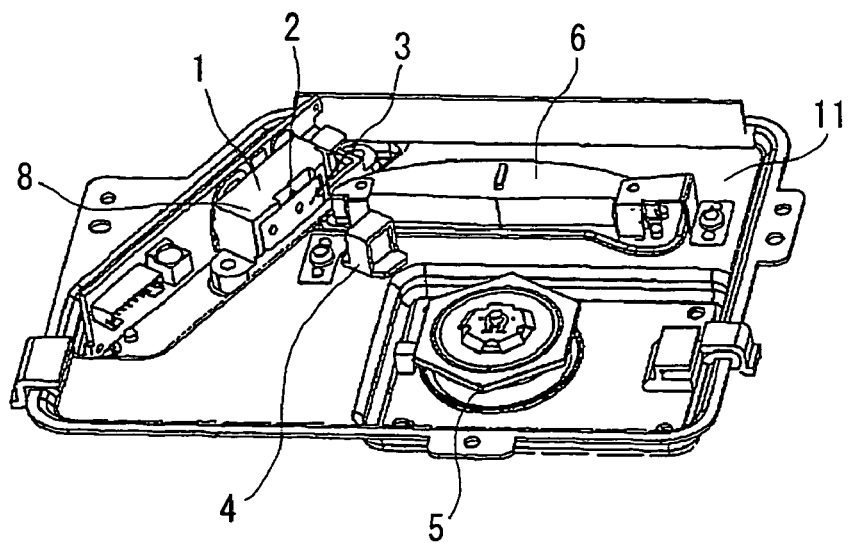
FIG. 19A is a perspective view showing the inside of an optical scanning apparatus according to Embodiment 3 of the present invention.
Figure 19B:
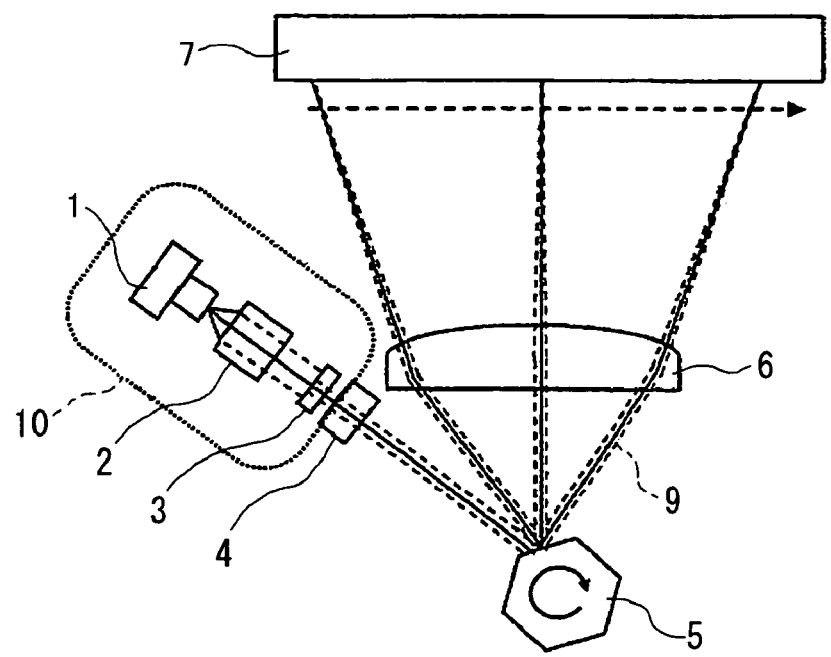
FIG. 19B is a diagram schematically showing a configuration of the optical scanning apparatus according to Embodiment 3 of the present invention.

Although a case in which a diffraction grating is incorporated in the collimating lens 2 was shown in this embodiment, the diffraction grating does not necessarily have to be incorporated in the collimating lens, and it is also possible to achieve the temperature compensation effect shown in FIG. 12C by forming the diffraction grating in a cylindrical lens 4 or the fθ lens 6 as shown in FIG. 19B. Accordingly, the above-described optimum thickness of the light source supporting plate 13 can be applied not only to a case where a hybrid lens is used as the collimating lens 2, but also to all cases where the optical scanning apparatus includes a hybrid lens.

Figure 16:
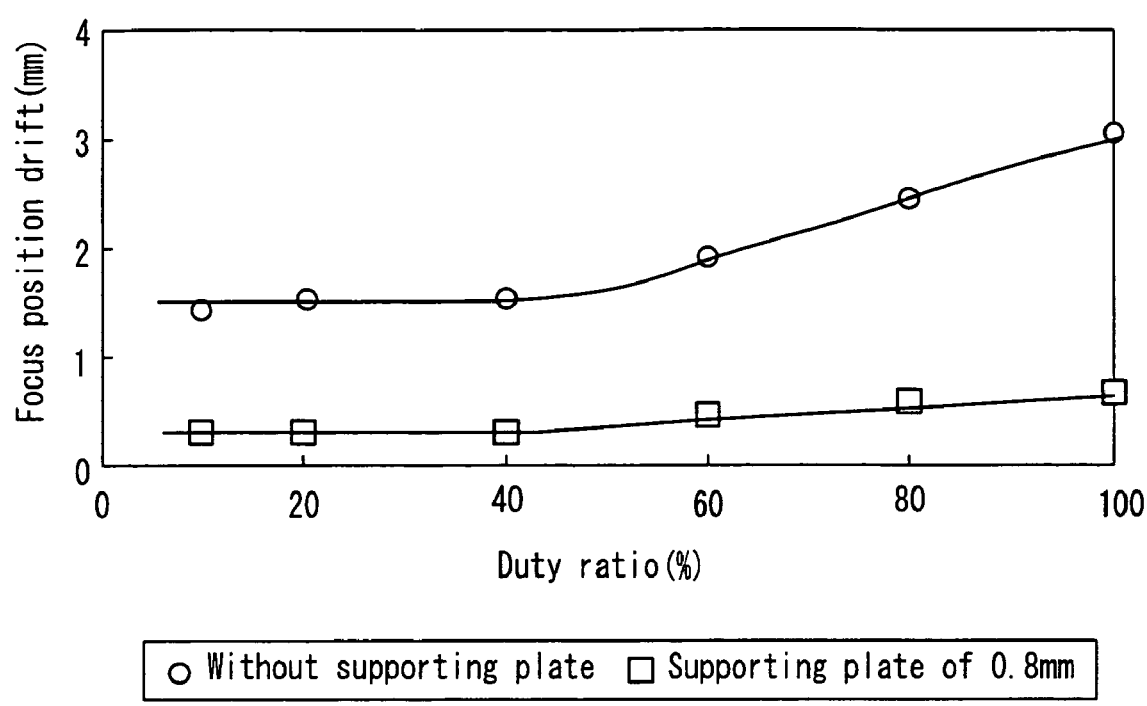
FIG. 16 is a graph showing a relationship between the drift amount of the focus position and the duty ratio when the light source is pulsed continuously.

Next, it is conceivable that the self-heating and the heat accumulation during operation of the light source are reduced to some extent if the light source is pulsed. FIG. 16 shows a relationship between the drift amount of the focus position and the ratio of "On" time to "OFF" time during pulsing (duty ratio=ON time÷cycle time) when the light source is pulsed continuously while maintaining the ON/OFF interval of the light source constant.

The cycle time was varied, while fixing the ON time at 1 sec, and the experiment was carried out for the duty ratios 10, 20, 40, 60, 80 and 100%. For the experiment, the same measuring apparatus and semiconductor laser as used in the continuous operation of FIG. 14 were used, and the light source supporting plate 13 having a thickness of 0.8 mm was selected. For comparison, experiment was also performed on a light source fixed directly to the circuit board 12 with solder, without using the light source supporting plate 13. The results are shown in FIG. 16.

Both the case where the light source supporting plate 13 is not present (white circles) and the case where the light source supporting plate 13 of 0.8 mm was used (white squares) show the tendency in which the drift amount increases when the duty ratio exceeds 60%. In an optical scanning apparatus, the effective angle of view of the polygon mirror is about 50%. This means that the actual duty ratio of the laser is about 50% if the ratio of black on a document to be printed in a printing apparatus is 100%.

Accordingly, it can be seen that the optical axis alignment of the light source and the distance adjustment in the optical axis direction may be performed while pulsing the light source at a duty ratio of at most 50%. However, in the case of pulsing the light source, there are several problems. First, the operator performs the adjustment operation while looking at the digital display of the beam diameter. When the light source is pulsed during this operation, the display of the beam diameter is interrupted, so that the operator may not be able to read the beam diameter.

In the case of the BeamScan used in this embodiment, the sensor is disposed behind a slit that allows light to pass through, and the peak power and its profile are measured by time-integrating the optical energy passing through the slit. The rotational frequency of the slit is 10 Hz. In order to perform an accurate measurement, the light source needs to be always on while the laser beam is passing through the slit. Further, it is necessary to continuously show the digital display for a certain time (about two seconds) in order to allow the operator to read the digitally displayed beam diameter. In that case, when the duty ratio is set to 20%, for example, the cycle time is 10 seconds, and it is impossible to perform the adjustment operation.

Figure 17:
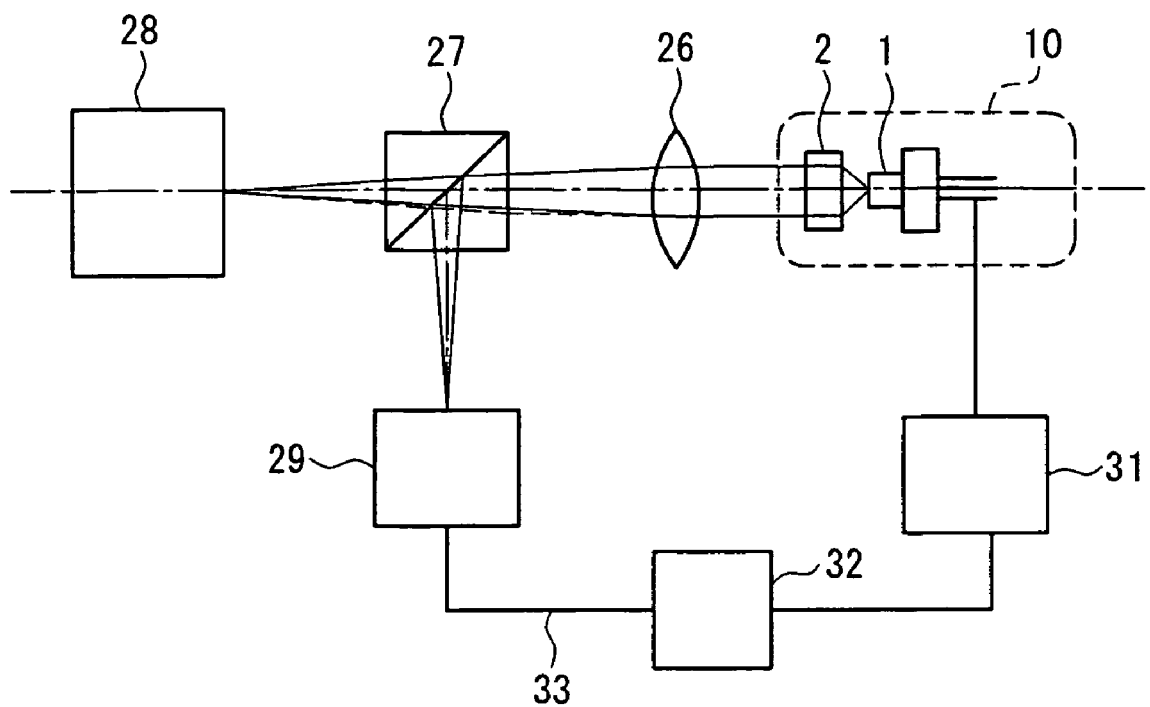
FIG. 17 is a diagram showing a configuration of the light source control apparatus according to Embodiment 1 of the present invention.

FIG. 17 shows a diagram showing a configuration of a light source control apparatus that can solve the above-described various problems in a highly effective manner. Since the basic parts of this light source control apparatus are the same as those shown in FIG. 8 described above, only different parts are described. The light source control apparatus shown in FIG. 17 is provided with a mechanism by which a measurement trigger signal 33 is received from the beam diameter measuring apparatus 29, and the on and off of a power source 31 for the light source is controlled by an on/off measurement synchronizer 32.

By using the present apparatus, it is possible to turn on the light source instantaneously only at the timing of the beam diameter measurement, and the beam diameter measuring apparatus can provide a display as if the light source is continuously on. Furthermore, by setting the lighting time in accordance with the minimum measurement time inherent to the measuring apparatus, it is possible to adjust the light source within the above-described appropriate duty ratio. In this case, a spot flashing at 10 Hz is seen on the CCD camera, and the spot appears to be flickering when it becomes asynchronous with the refresh rate of the monitor. In this case, the refreshing of the monitor also may be synchronized with the BeamScan.

EMBODMENT 2

Figure 18A:
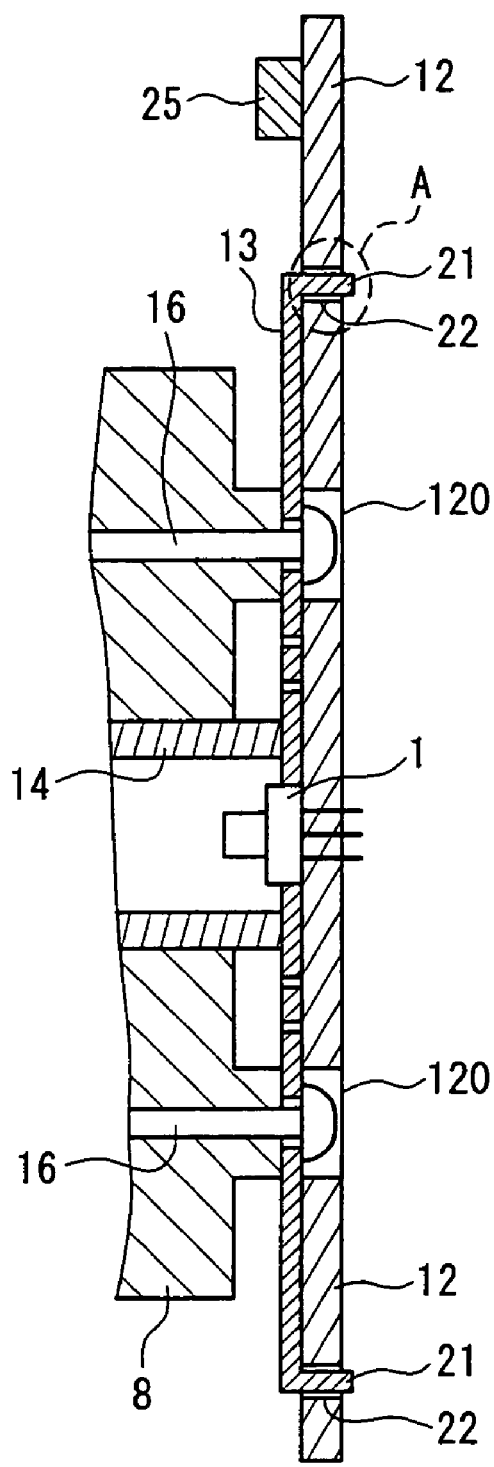
FIG. 18A is a cross-sectional view showing a portion near a light source unit according to Embodiment 2 of the present invention.
Figure 18B:
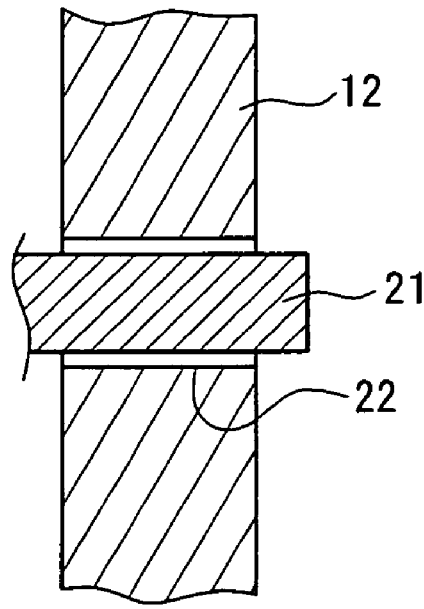
FIG. 18B is an enlarged view of the portion A in FIG. 18A.

FIG. 18A shows a cross-sectional view showing the configuration of a modification of Embodiment 1 in a simplified manner. FIG. 18B is an enlarged view showing a portion near the projection 21 (A portion) in FIG. 18A. The basic configuration of a light source apparatus according to this embodiment is the same as that of the light source apparatus described in Embodiment 1, and therefore only different parts are described. In the light source apparatus of this embodiment, two projections 21 for fixing the laser driving circuit are formed in the light source supporting plate 13, and engaging holes 22 corresponding to the projections 21 are formed in the circuit board 12.

The operations of assembly and adjustment of the light source apparatus in this embodiment are the same as those in Embodiment 1. In FIGS. 18A, a horizontal synchronization detecting light sensor 25 is mounted to the end of the circuit board 12. Because the vibration of the horizontal synchronization detecting light sensor 25 directly affects jitter in particular, and for layout reasons, this sensor is usually mounted to the end of the circuit board 12.

The vibration amplitude is greater at the end of the circuit board 12 than at the central portion. Therefore, in this embodiment, an anti-vibration adhesive is dropped and cured on the engaging portions between the two projections 21 of the light source supporting plate 13 and the engaging holes 22 of the circuit board 12 of the light source apparatus for which the adjustment of the optical axis and the distance in the optical axis direction have been completed. In Embodiment 1, only the fixing screws 16 and the circuit board 12 were fixed with an adhesive. In contrast, by adopting a configuration in which the length of the light source supporting plate 13 is extended and the light source supporting plate 13 and the circuit board 12 are fixed with an adhesive as in this embodiment, it is possible to increase the bonding power between the circuit board 12 and the light source supporting plate 13 and increase the rigidity of the circuit board 12.

With such a configuration, it is possible to prevent the light source from vibrating to cause the problems of the jitter and color drift more effectively even if strong vibrations and impacts are exerted within the apparatus or from the outside during the operation of the apparatus.

When an adhesive is selected whose rigidity determined by its hardness and applied amount is sufficiently smaller than the rigidity of the light source supporting plate 13, the optical axis and the distance in the optical axis direction will not fluctuate due to the curing and the volume reduction of the anti-vibration adhesive. As the anti-vibration adhesive, the above-described ultraviolet light curing adhesive that is provided with anaerobic properties is most suitable.

EMBODIMENT 3

FIG. 19A is a perspective view showing the internal structure of an optical scanning apparatus according to Embodiment 3. FIG. 19B is a diagram schematically showing a configuration of the optical scanning apparatus according to Embodiment 3. Although the optical scanning apparatus according to Embodiment 3 is shown as an example in FIGS. 19A and 19B, a similar configuration also will be achieved by disposing the light source apparatuses according to Embodiments 1 and 2 on a frame 11. That is to say, although various configurations are possible in which the lateral position of the light source and the detailed design of other components are changed, the basic configuration will be the same as shown in FIGS. 19A and 19B.

In FIGS. 19A and 19B, the divergent light emitted from the light source (semiconductor laser) 1 passes through the collimating lens 2, the diaphragm 3 and the cylindrical lens 4, and is reflected and scanned at the polygon mirror 5. It thereafter passes through the fθ lens 6, is imaged on the photosensitive material 7, over which it is scanned at constant speed. In the light source apparatus 10, the divergent light beam emitted from the light source is converted into a parallel light beam at the collimating lens 2, which is shaped by passing through the diaphragm 3.

Figure 20A:
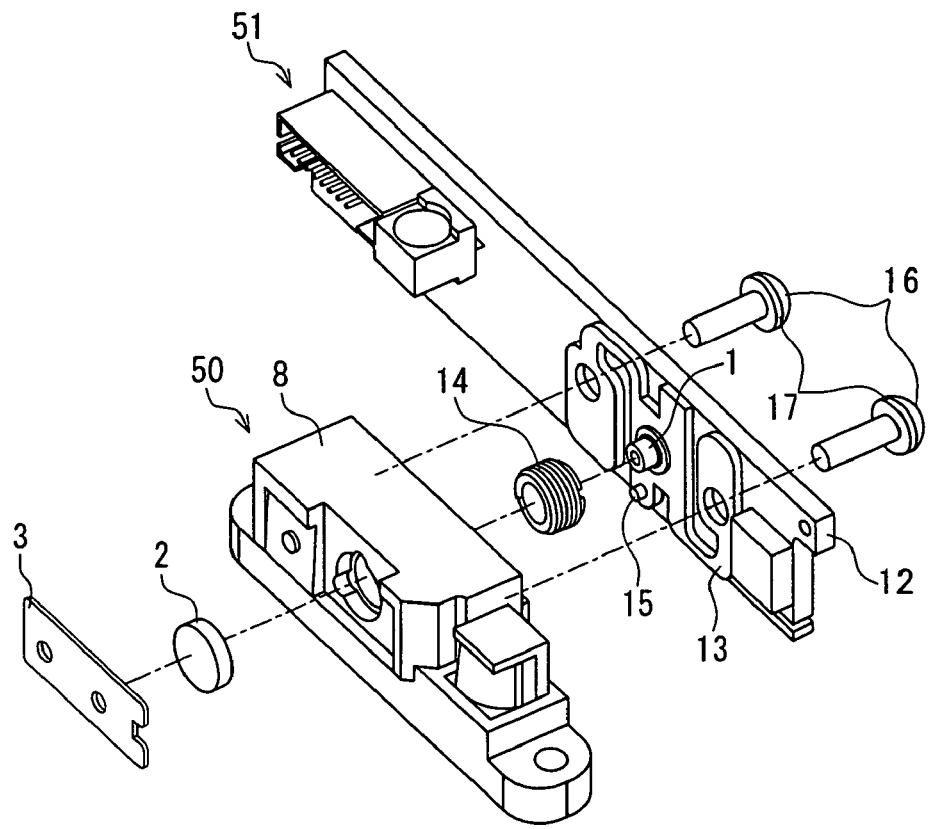
FIG. 20A is a perspective view of a light source apparatus according to Embodiment 3 of the present invention, as viewed obliquely from the front.
Figure 20B:
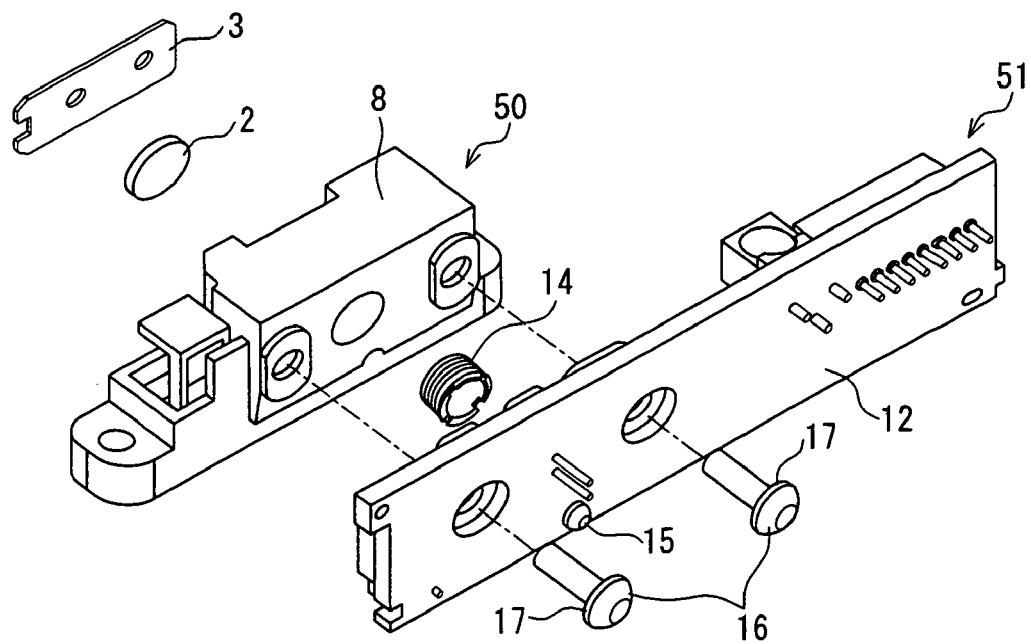
FIG. 20B is a perspective view of the light source apparatus according to Embodiment 3 of the present invention, as viewed obliquely from the back.

In the following, the characteristics of this embodiment are described. FIGS. 20A and 20B are exploded views showing a configuration of the light source apparatus used in Embodiment 3. The collimating lens unit 50 is provided with the collimating lens 2, the diaphragm 3, the collimating lens base 8 and the adjusting screw 14. The light source unit 51 is configured by fastening the light source supporting plate 13, to which the light source 1 has been press-fitted and fixed, to the circuit board 12 with the fixing screw 15. The circuit board 12 is bonded to the collimating lens base 8 with the fixing screws 16. The assembly procedure is the same as described in Embodiment 1, and therefore detailed description thereof is omitted here.

Figure 21A:
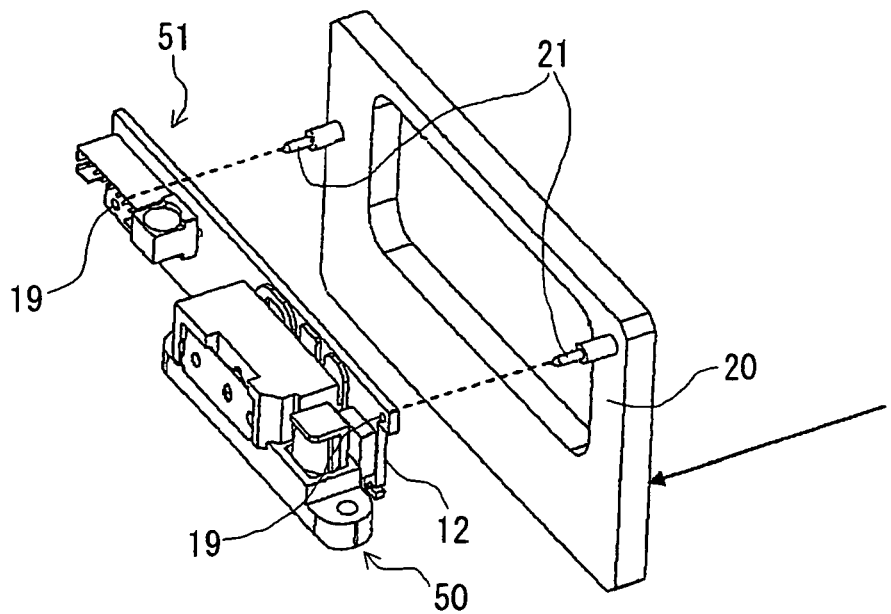
FIG. 21A is a perspective view illustrating an optical axis adjustment using an optical axis adjustment jig 20 according to Embodiment 3 of the present invention.
Figure 21B:
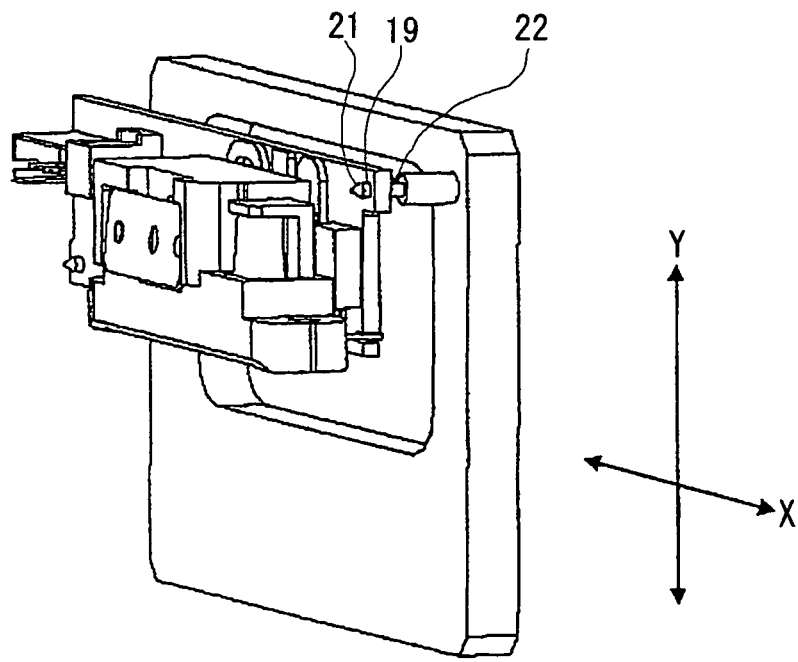
FIG. 21B is a perspective view showing a state in which positioning holes 19 of the light source apparatus are fit to an optical axis positioning pin 21 of the optical axis adjustment jig 20 according to Embodiment 3 of the present invention.

FIGS. 21A and 21B are simplified diagrams showing the optical axis adjustment between the collimating lens unit 50 and the light source unit 51. In this embodiment, two positioning holes 19 are formed in the circuit board 12. The optical axis adjustment jig 20 is provided with a sliding device (not shown) that moves in the optical axis direction. The optical axis adjustment jig 20 is moved forward using the sliding device as indicated by the arrow in FIG. 21A such that the optical axis positioning pins 21 fit to the positioning holes 19 formed in the circuit board 12 as shown in FIG. 21B.

A sliding regulation member (not shown) is provided to the sliding device of the light source adjustment jig 20, so that a space 22 is secured in which the circuit board 12 can be moved backward even in a state in which the light source adjustment jig 20 is moved forward to the maximum (FIG. 21B). With this configuration, it is possible to perform the distant adjustment of the light source, which moves together with the circuit board 12, by moving the circuit board 12. The space 22 may be of any size that is greater than the movement amount of the light source during the distance adjustment, and was set to 1 mm in this embodiment.

The optical axis adjustment jig 20 is provided with an XY table capable of moving vertically and horizontally, and the light source unit 51 of the light source apparatus can be finely adjusted vertically and horizontally by operating the XY table. In view of the long term reliability of the jig and the dimensional change due to the temperature change in the factory, a metallic material having a small linear expansion coefficient and being resistant to rusting and wearing is preferable as the optical axis adjustment jig 20. In this embodiment, a SUS 304 was selected, and the sliding device and the XY table were connected with a screw.

In the optical axis adjustment using the light source adjustment jig 20 described with reference to FIGS. 21A and 21B, first, the optical axis is confirmed with the CCD camera, while operating the light source, and the fixing screws 16 (FIGS. 20A and 20B) fixing the light source supporting plate 13 are loosened slightly. Thereafter, the light source unit 51 is moved in a plane perpendicular to the optical axis with the XY table of the optical axis adjustment jig 20 so that the optical axes are caused to coincide, and thereafter the fixing screws 16 are tightened again, completing the optical axis adjustment.

A glass epoxy substrate was selected for the circuit board 12, and the positioning holes 19 and the area surrounding them are electrically insulated, without providing any wiring pattern. When the power source is connected to light the light source in this state, the light source supporting plate 13 has a potential of 5 V. However, current leakage does not occur through the collimating lens base 8 and the optical axis adjustment jig 20, since they are electrically insulated.

Since the light source supporting plate 13 being charged at 5 V is covered with the collimating lens base 8, the light source drive circuit and the like at its periphery, there is a low risk of causing current leakage through a human body and causing an electric shock when the operator touches, by mistake, the light source supporting plate 13 during the adjustment.

Although the positioning holes 19 are formed in the circuit board 12 in this embodiment, it is also possible to adopt a configuration in which the positioning holes 19 are formed in the light source supporting plate 13. With this configuration, the light source supporting plate 13 is made larger, and the positioning holes 19 are formed in the portion of the light source supporting plate 13 that projects from the circuit board 12. The positioning pins 21 are inserted into the positioning holes 19 formed in the light source supporting plate 13. In this case, either the positioning pins 21 or the entire optical axis adjustment jig 20 is formed by an insulating material.

Examples of the insulating material include plastic and ceramics. In this case, in order to ensure high reliability that allows long term use, plastic should not be selected in terms of wear, for example. However, ceramics products are difficult to produce, and are problematic in terms of availability, cost and so on. Furthermore, this configuration increases the risk of causing breakdown of the light source, the light source drive circuit and the power source due to current leakage and an electric shock when the operator touches, by mistake, the portion of the light source supporting plate 13 that is projected from the light source apparatus during the adjustment.

In addition, the positioning holes 19 and the positioning pins 21 slide during the adjustment, and the number of times of the insertion and extraction of the positioning pins 21 increases when multiple apparatuses are adjusted, so that the insulating material itself may be charged. When the positioning pins 21 that are charged at a high voltage are brought into contact with the light source supporting plate 13, electrostatic breakdown of the light source occurs.

For these reasons, as in this embodiment, it is preferable to form the positioning holes 19 in the circuit board 12 and cause the optical axis adjustment jig 20 to fit to the positioning pins 21, rather than forming the positioning holes 19 in the light source supporting plate 13. It is preferable to adopt a configuration in which the light source adjustment jig 20 is electrically grounded, and the positioning holes 19 and the area surrounding them also are electrically grounded.

Figure 22A:
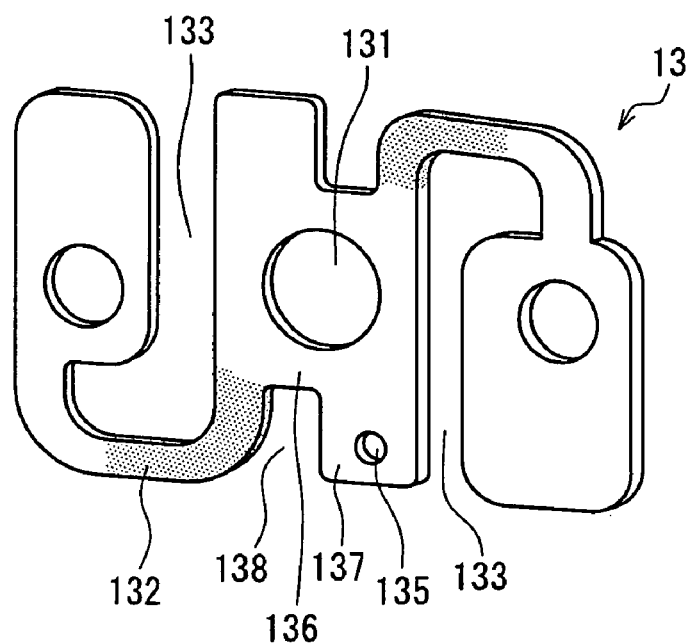
FIG. 22A is a perspective view of a light source supporting plate according to Embodiment 3 of the present invention.
Figure 22B:
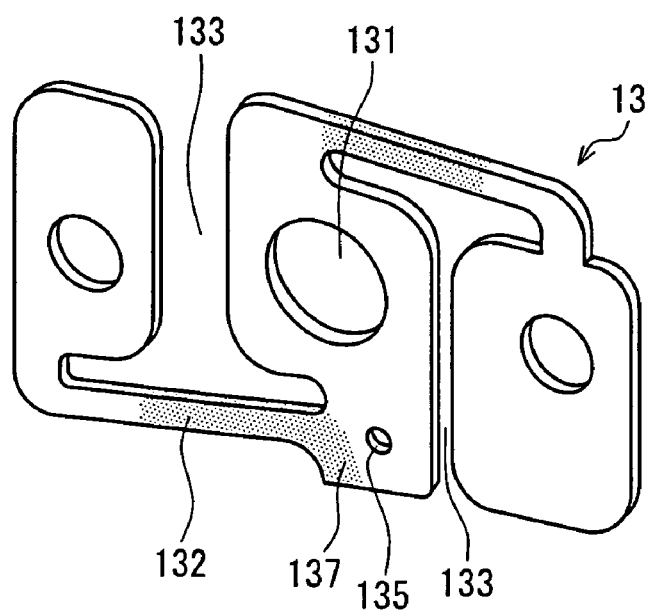
FIG. 22B is a perspective view of a light source supporting plate according to a comparative example.

Next, the shape of the light source supporting plate 13 is described. FIG. 22A shows a perspective view of a light source supporting plate 13 according to this embodiment, and FIG. 22B shows a perspective view of a light source supporting plate 80 according to a comparative example. For the sake of description, the structural components in FIG. 22B corresponding to those in FIG. 22A are denoted by the same reference numerals.

The light source supporting plate 13 of this embodiment is different from the light source supporting plate 13 (see FIG. 3A) used in Embodiment 1 with regard to the placement of the elastic deformation portion 132 and the internal thread portion 135. In Embodiment 1, the fine slits 133 are formed by wire cutting between the elastic deformation portion 132 and the fixing portion surrounding the internal thread portion 135, as shown in FIG. 3A.

In contrast, the slits 133 have a width that is larger than the plate thickness, and can be processed by press punching in this embodiment, as shown in FIG. 22A. With this configuration, it is possible to decrease the production cycle time, thus providing a more inexpensive light source apparatus.

Here, in Embodiment 1, as shown FIG. 3A, the connecting area 136 connecting the elastic deformation portion 132 (beam) to its adjacent area and the fixing portion 137 surrounding the internal thread portion 135 are arranged such that they do not face each other. This prevents propagation of the elastic deformation of the elastic deformation portion 132 to the fixing portion, thus preventing generation of a stress at the fixing portion.

That is, the internal thread portion 135 is disposed at a position displaced downward with respect to the connecting portion 136 such that the elastic deformation portion 132, the connecting portion 137 and the fixing portion 137 surrounding the internal thread portion 135 will not be arranged in a row in a horizontal direction. By arranging the elastic deformation portion 132 and the fixing portion 137 surrounding the internal thread portion 135 such that they do not face each other, the elastic deformation of the elastic deformation portion 132 is prevented from propagating to the fixing portion 137, thus preventing generation of stress at the fixing portion 137.

More specifically, in order to reduce the size of the light source apparatus, the elastic deformation portion 132 serving as the beam is formed into a U-shape, and a space 138 is provided between the internal thread portion 135 and the elastic deformation portion 132 by cutting away the light source supporting plate 13, as shown in FIG. 22A.

An analysis was made on the stress distribution obtained when the light source supporting plate 13 shown in FIG. 22A was used with its periphery, which corresponds to a fixing spring, being fixed, and a pressing force of 30 N was exerted on the area surrounding the hole 131. The shaded areas in FIG. 22A are areas that were locally deformed by application of the pressing force. From this result, it can be seen that the deformation of the elastic deformation portion 132 did not extend to the fixing portion 137 surrounding the internal thread portion 135.

FIG. 22B shows a comparative example in which the shape of the light source supporting plate 13 was changed, while maintaining the beam length of the elastic deformation portion 132 the same as that shown in FIG. 22A. An analysis was also made on the stress distribution obtained when the pressing force was applied to the light source supporting plate 13 of FIG. 22B in the same manner as with the light source supporting plate 13. Similarly to FIG. 22A, the shaded areas are the areas that were locally deformed by application of the pressing force. When comparing the shaded areas of FIG. 22A and those of FIG. 22B, the deformation of the elastic deformation portion extended to the vicinity of the internal thread portion 135 in the comparative example shown in FIG. 22B, and a change due to a localized distortion can be observed at the fixing portion 137 surrounding the internal thread portion 135.

This indicates that a distortion occurs at the internal thread portion 135 that fixes the circuit board 12, as a result of a deformation of the light source supporting plate 13 that is caused by rotation of the adjusting screw 14 during the distance adjustment of the light source. Since the internal thread portion 135 is fastened to the circuit board 12 with a screw, distortion generated in the vicinity of this fastened portion causes loosening of the screws or a deformation of the circuit board 12. This causes generation of a stress at the soldered portion of the light source that has been press-fitted and fixed or the components mounted to the circuit board 12, possibly causing the failure of the circuit board 12. Even if the failure does not occur, a distortion occurs between the light source supporting plate 80 and the circuit board 12, leading to a displacement in the orientation of the light source (optical axis).

In the case of FIG. 22A, on the other hand, the space 138 is provided between the elastic deformation portion 132 and the internal thread portion 135, so that the distortion energy of the elastic deformation portion 132 does not reach the internal thread portion 135. Consequently, no local distortion was observed in the area surrounding the internal thread portion 135, and the light source press-fitting portion, i.e., the area surrounding the hole 131. It is preferable to provide a space between the elastic deformation portion and the connecting portion in this way such that the distortion energy of an elastic deformation will not propagate to the areas in which the light source supporting plate 13 and the circuit board 12 are bonded together.

Figure 23:
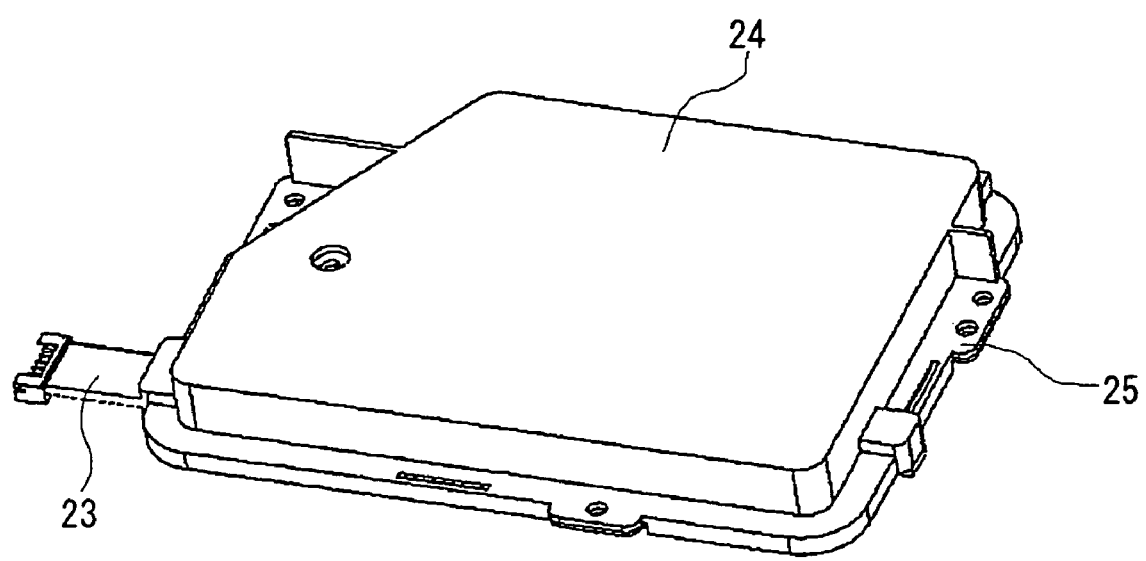
FIG. 23 is a perspective view of an optical scanning apparatus according to Embodiment 3 of the present invention.
Figure 24A:
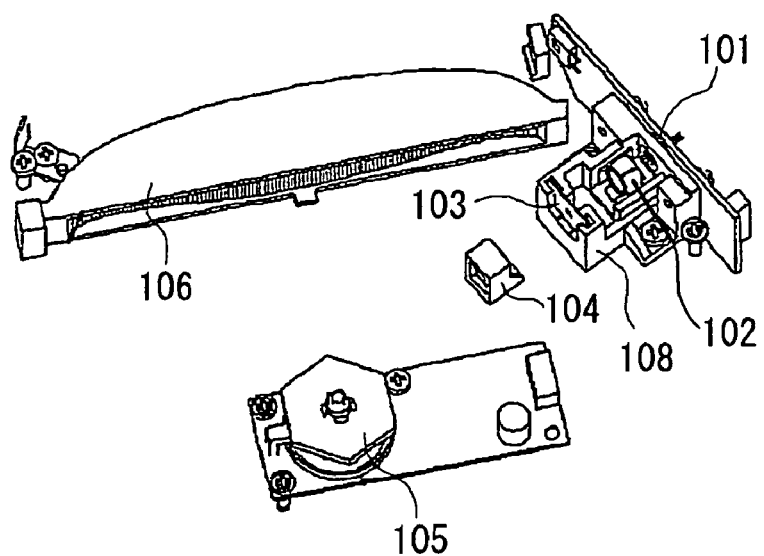
FIG. 24A is a schematic perspective view of an example of a related art optical scanning apparatus.
Figure 24B:
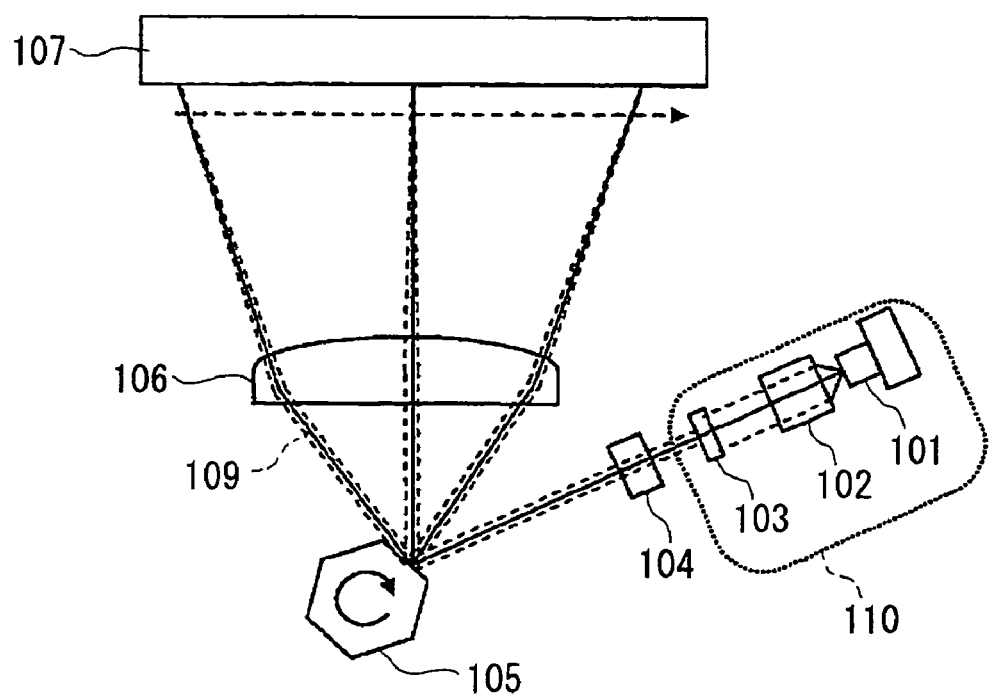
FIG. 24B is a top view showing the configuration of the main optical components of a related art optical scanning apparatus.
Figure 25:
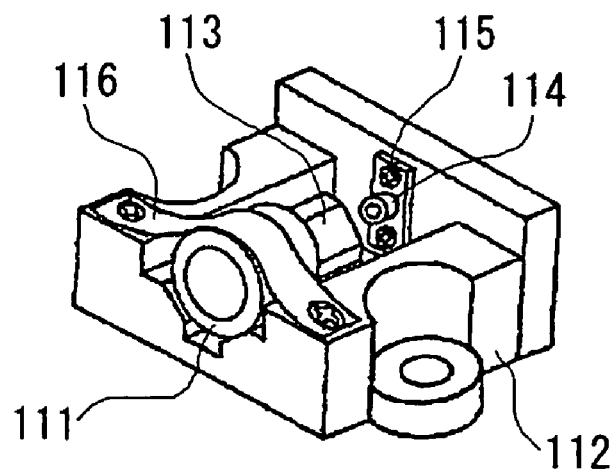
FIG. 25 is a perspective view showing an example of a distance adjustment of a related art light source apparatus.
Figure 26:
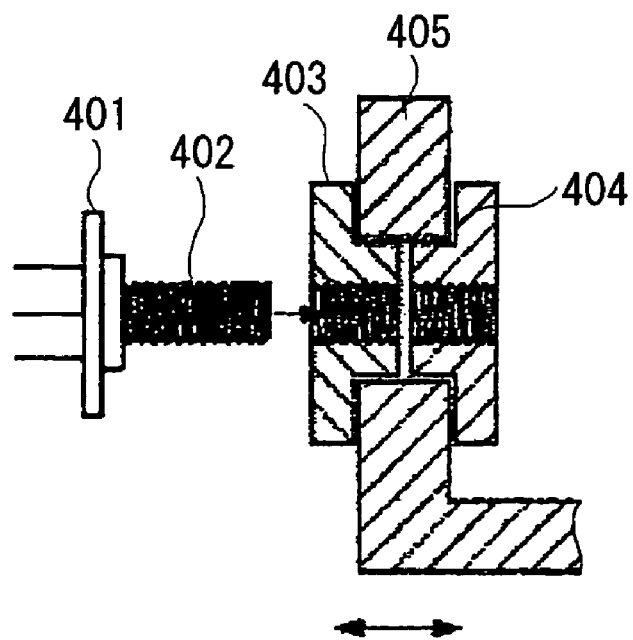
FIG. 26 is a cross-sectional view showing another example of a distance adjustment of a related art light source apparatus.

FIG. 23 shows an external view of a completed optical scanning apparatus. The optical scanning apparatus according to this embodiment is completed by mounting an outer jacket 24 thereto. In this embodiment, an intermediate cable 23 is attached such that electrical connection to the body of the printing apparatus can be established from the outside of the outer jacket 24 while the outer jacket 24 is mounted to the body of the optical scanning apparatus.

When mounting the optical scanning apparatus to the printing apparatus, the electrical connection between the body of the printing apparatus and the optical scanning apparatus is established via the intermediate cable 23. With a configuration in which the intermediate cable 23 is not used, a signal cable from the body of the printing apparatus is directly connected to a wiring connector disposed at the circuit board 12 of the light source apparatus. In this case, an external force is exerted on the circuit board 12 of the light source apparatus when attaching the signal cable. An excessive external force exerted on the circuit board 12 may cause the light source supporting plate 13 to deform via the circuit board 12, thus displacing the optical axis or the focus of the light source.

The configuration of this embodiment includes the intermediate cable 23, and the intermediate cable 23 is interposed between the outer jacket 24 and a frame 25. Accordingly, the intermediate cable 23 maintains a fixed state to such an extent that the external force applied to the intermediate cable 23 is not transmitted to the inside of the outer jacket 24. With this configuration, an excessive external force will not be exerted on the circuit board 12 when mounting the optical scanning apparatus to the body of the printing apparatus, so that it is possible to prevent further displacement from the optical axis.

As described above, the light source apparatus according to the present invention can adjust the distance between the semiconductor laser and the collimating lens in the optical axis direction with a high precision, and the present invention therefore is useful as an optical scanning apparatus, more specifically, an image recording apparatus such as a laser printer, a multifunction device and a facsimile.

The invention may be embodied in other forms without departing from the gist thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The foregoing description of implementations and embodiments of the invention have been presented for purposes of non-limiting illustration and description. Although the present invention has been described herein with reference to particular structures, materials and embodiments, the present invention is not intended to be limited to the particular features and details disclosed herein. Rather, the present invention extends to all functionally equivalent structures, methods and uses, such as are within the scope of the appended claims. The descriptions provided herein are not exhaustive and do not limit the invention to the precise forms disclosed. The foregoing embodiment examples have been provided merely for purposes of explanation and are in no way to be construed as limiting the scope of the present invention. The words that have been used herein are words of description and illustration, rather than words of limitation. The present teachings can readily be realized and applied to other types of apparatuses. Further, modifications and variations, within the purview, scope and sprit of the appended claims and their equivalents, as presently stated and as amended hereafter, are possible in light of the above teachings or may be acquired from practicing the invention. Furthermore, although elements of the invention may be described or claimed in the singular, the plural is contemplated unless limitation to the singular is explicitly stated Alternative structures discussed for the purpose of highlighting the invention's advantages do not constitute prior art unless expressly so identified. No one or more features of the present invention are necessary or critical unless otherwise specified.

What is claimed is:

1. A light source apparatus comprising:
   a light source unit including a light source and a light source supporting member having elasticity in an optical axis direction, said light source and said light source supporting member being coupled together;
   a collimating lens;
   a collimating lens base member on which said collimating lens is supported; and
   an optical axis direction adjusting member disposed between the light source unit and the collimating lens base member,
   wherein a position of the light source unit can be adjusted within a plane approximately perpendicular to the optical axis and the light source unit can thereafter be secured relative to the collimating lens base member via the light source supporting member, and
   wherein the optical axis direction adjusting member is movable in the optical axis direction, and is disposed such that by its movement it causes the light source supporting member to deform against the elasticity of the light source supporting member, thereby allowing an adjustment of a position of the light source with respect to the collimating lens in the optical axis direction.

2. The light source apparatus according to claim 1,
   wherein a circuit board including at least a portion of a driving circuit of the light source is coupled to the light source unit, and the light source, the light source supporting member, and the circuit board are coupled together integrally.

3. The light source apparatus according to claim 1,
   wherein the collimating lens is mounted to the collimating lens base member with an adhesive, and the collimating lens is supported to the collimating lens base member by heat-treating the collimating lens base member in a state in which a portion of the adhesive is cured.

4. The light source apparatus according to claim 1,
   wherein the optical axis direction adjusting member is an adjusting member that is screwed to the collimating lens base member and is movable in the optical axis direction by its rotation, and includes a tool receiving portion for receiving a tool inserted from a direction transverse to the optical axis direction to perform adjustment of the position of the light source with respect to the collimating lens in the optical axis direction.

5. The light source apparatus according to claim 1,
   wherein a portion of the optical axis direction adjusting member that is in contact with the light source supporting member has an annular portion for enveloping an outer circumference of the light source.

6. The light source apparatus according to claim 5, wherein an outer circumference of the annular portion has a polygonal shape, or a groove is formed in the annular portion.

7. The light source apparatus according to claim 5, wherein the optical axis direction adjusting member is screwed to the collimating lens base member, and a portion of the optical axis direction adjusting member that is in contact with the light source supporting member has an outer diameter larger than an outer diameter of a portion of the optical axis direction adjusting member that is screwed to the collimating lens base member.

8. The light source apparatus according to claim 1, wherein the light source unit is secured relative to the collimating lens base member, after adjustment of the position of the light source with respect to the collimating lens in the optical axis direction.

9. The light source apparatus according to claim 8, wherein the light source unit is secured with an anaerobic ultraviolet curing resin.

10. The light source apparatus according to claim 1, wherein the light source unit has at least one positioning hole for performing a positional adjustment of the light source in a plane approximately perpendicular to the optical axis.

11. The light source apparatus according to claim 10, wherein the positioning hole is electrically insulated from a source voltage of the light source.

12. The light source apparatus according to claim 10, wherein a circuit board including at least a portion of a driving circuit of the light source is coupled to the light source unit, and the positioning hole is formed in the circuit board.

13. The light source apparatus according to claim 1, wherein the collimating lens base member is made of an electrically insulating material.

14. The light source apparatus according to claim 2, wherein the light source supporting member is smaller than the circuit board, both vertically and horizontally.

15. The light source apparatus according to claim 2, wherein the light source supporting member includes an elastic deformation portion and a fixing portion for fixing to the circuit board, and the elastic deformation portion and the fixing portion are arranged such that they are not arranged in a row.

16. The light source apparatus according to claim 1, wherein an intermediate electric signal line is connected to a driving circuit of the light source.

17. The light source apparatus according to claim 1, wherein the light source supporting member has a natural oscillation frequency that is higher than a rotational frequency of a scanning apparatus mounted to an optical scanning apparatus to which the light source apparatus is mounted.

18. The light source apparatus according to claim 1, wherein:
at least one of the light source apparatus and an optical scanning apparatus to which the light source apparatus is mounted includes a hybrid lens in which a diffraction grating is incorporated into a refractive lens,
a perimeter flange portion of the light source is press-fitted and fixed to the light source supporting member in the light source unit, and
the light source supporting member has a thickness that is at least half a thickness of the perimeter flange portion of the light source.

19. The light source apparatus according to claim 1, wherein:
at least one of the light source apparatus and an optical scanning apparatus to which the light source apparatus is mounted includes a hybrid lens in which a diffraction grating is incorporated into a refractive lens, and
at least one of an optical axis alignment of the light source, a distance adjustment in the optical axis direction, and a final inspection of the optical scanning apparatus are performed, while the light source is continuously pulsed.

20. An optical scanning apparatus comprising:
the light source apparatus according to claim 1;
an imaging optical system that images light emitted from the light source apparatus on a scanning surface; and
a scanning apparatus that scans the imaged light on the scanning surface.

21. The optical scanning apparatus according to claim 20, wherein a hybrid lens in which a diffraction grating is incorporated into a refractive lens is mounted, and the light source is continuously pulsed during an assembly adjustment and an inspection of the optical scanning apparatus.

22. The optical scanning apparatus according to claim 20, wherein the light source apparatus is mounted in an outer jacket, an intermediate electric signal line that is guided to the outside of the outer jacket is connected to a driving circuit of the light source, and a portion of the intermediate electric signal line is fixed.

23. The optical scanning apparatus according to claim 20, wherein the light source supporting member has a natural oscillation frequency that is higher than a rotational frequency of the scanning apparatus.

24. The optical scanning apparatus according to claim 20, wherein a hybrid lens in which a diffraction grating is incorporated into a refractive lens is included,
a perimeter flange portion of the light source is press-fitted and fixed to the light source supporting member in the light source unit, and
the light source supporting member has a thickness that is at least half a thickness of the perimeter flange portion of the light source.

25. A method for adjusting a light source apparatus comprising a light source unit including a light source and a light source supporting member having elasticity in an optical axis direction, the light source and the light source supporting member being coupled together, a collimating lens, a collimating lens base member on which the collimating lens is supported, and an optical axis direction adjusting member that is disposed between the light source unit and the collimating lens base member and that is in contact with the light source supporting member, the method comprising:
(a) moving the optical axis direction adjusting member to deform the light source supporting member against the elasticity of the light source supporting member, thereby adjusting a position of the light source with respect to the collimating lens in the optical axis direction; and
(b) adjusting a position of the light source unit in a plane approximately perpendicular to the optical axis and thereafter securing the light source unit relative to the collimating lens base member via the light source supporting member.

26. The method for adjusting a light source apparatus according to claim 25, wherein:

the collimating lens is bonded to the collimating lens base member with an adhesive, and the collimating lens is supported to the collimating lens base member by temporarily curing the adhesive and thereafter heat-treating the collimating lens base member on which the collimating lens has been bonded.

27. The method for adjusting a light source apparatus according to claim 25, wherein securing the light source unit to the collimating lens base member is performed after step (a).

28. The method for adjusting a light source apparatus according to claim 25, wherein:

at least one of the light source apparatus and an optical scanning apparatus to which the light source apparatus is mounted includes a hybrid lens in which a diffraction grating is incorporated into a refractive lens, and at least one of an optical axis alignment of the light source, a distance adjustment in the optical axis direction and a final inspection of the optical scanning apparatus is performed, while the light source is continuously pulsed.

29. A method for producing an optical scanning apparatus comprising a light source apparatus including a light source unit including a light source and a light source supporting member having elasticity in an optical axis direction, the light source and the light source supporting member being coupled together, a collimating lens, a collimating lens base member on which the collimating lens is supported, and an optical axis direction adjusting member that is disposed between the light source unit and the collimating lens base member and that is in contact with the light source supporting member, the method comprising:

(a) moving the optical axis direction adjusting member to deform the light source supporting member against the elasticity of the light source supporting member, thereby adjusting a position of the light source with respect to the collimating lens in the optical axis direction; and (b) adjusting a position of the light source unit in a plane approximately perpendicular to the optical axis and thereafter securing the light source unit to the collimating lens base member via the light source supporting member.

30. The method for producing an optical scanning apparatus according to claim 29, wherein:

the optical scanning apparatus includes a hybrid lens in which a diffraction grating is incorporated into a refractive lens, and at least one of an assembly adjustment and an inspection of the optical scanning apparatus is performed, while the light source is continuously pulsed.

* * * * *